US012731228B2

(12) United States Patent
Bury et al.

(10) Patent No.: US 12,731,228 B2
(45) Date of Patent: Sep. 8, 2026

(54) INTERACTIVELY ADJUSTING LIGHT SOURCE BRIGHTNESS IN DIGITAL IMAGES WITH NON-DESTRUCTIVE SYNTHETIC LENS BLUR

(71) Applicant: Adobe Inc., San Jose, CA (US)

(72) Inventors: Joshua Bury, Grants Pass, OR (US); Richard Case, Hamburg (DE)

(73) Assignee: Adobe Inc., San Jose, CA (US)

(*) Notice: Subject to any disclaimer, the term of this patent is extended or adjusted under 35 U.S.C. 154(b) by 344 days.

(21) Appl. No.: 18/536,831

(22) Filed: Dec. 12, 2023

(65) Prior Publication Data

US 2025/0104198 A1 Mar. 27, 2025

Related U.S. Application Data

(60) Provisional application No. 63/585,369, filed on Sep. 26, 2023.

(51) Int. Cl.
*G06T 5/70* (2024.01)
*G06T 3/40* (2006.01)
(Continued)

(52) U.S. Cl.
CPC .................. *G06T 5/70* (2024.01); *G06T 3/40* (2013.01); *G06T 5/20* (2013.01); *G06T 5/50* (2013.01);
(Continued)

(58) Field of Classification Search
CPC .... G06T 5/70; G06T 3/40; G06T 5/20; G06T 5/50; G06T 5/92; G06T 7/13;
(Continued)

(56) References Cited

U.S. PATENT DOCUMENTS 8,467,601 B2 * 6/2013 Daisy ...................... G06T 11/60 382/165
8,885,971 B2 * 11/2014 Hori ...................... G06V 10/20 382/167

(Continued)

FOREIGN PATENT DOCUMENTS

CN 114372931 B * 3/2025 ............... G06T 5/94

OTHER PUBLICATIONS

U.S. Appl. No. 18/536,812, Oct. 24, 2025, Notice Allowance.

(Continued)

*Primary Examiner* — Neil R Mclean
(74) *Attorney, Agent, or Firm* — Keller Preece PLLC

(57) ABSTRACT

Methods, systems, and non-transitory computer readable storage media are disclosed for generating a lens blur effect in a digital image with interactive light source adjustment. The disclosed system determines a gradient mask by detecting edges of a luminance map comprising luminance values of pixels in a digital image. The disclosed system determines a highlight mask by thresholding the luminance map to determine a subset of pixels with luminance values meeting a threshold luminance. The disclosed system also generates a gradient-highlight mask including pixel values from a combination of the gradient mask and the highlight mask. The disclosed system further generates a highlight guide image comprising indications of one or more light sources in the digital image based on the gradient-highlight mask and the highlight mask.

20 Claims, 28 Drawing Sheets

(51) Int. Cl.

| | |
|---|---|
| ***G06T 5/20*** | (2006.01) |
| ***G06T 5/50*** | (2006.01) |
| ***G06T 5/92*** | (2024.01) |
| ***G06T 7/13*** | (2017.01) |
| ***G06T 7/136*** | (2017.01) |

(52) U.S. Cl.
CPC .................. *G06T 5/92* (2024.01); *G06T 7/13* (2017.01); *G06T 7/136* (2017.01); *G06T 2200/24* (2013.01); *G06T 2207/20081* (2013.01)

(58) Field of Classification Search
CPC ................. G06T 7/136; G06T 2200/24; G06T 2207/20081; G06T 2207/10024; G06T 2207/20084; G06T 5/60; G06T 5/73
USPC .......................................................... 382/155
See application file for complete search history.

(56) References Cited

U.S. PATENT DOCUMENTS

| | | | | |
|---|---|---|---|---|
| 11,074,704 | B2 | 7/2021 | Bleyer et al. | |
| 11,393,100 | B2 | 7/2022 | Zhang et al. | |
| 11,798,180 | B2 | 10/2023 | Yin et al. | |
| 2010/0002263 | A1 | 1/2010 | Shindoh | |
| 2014/0267243 | A1 | 9/2014 | Venkataraman et al. | |
| 2016/0182893 | A1 | 6/2016 | Wan et al. | |
| 2019/0272626 | A1* | 9/2019 | Rhee | G06T 15/506 |
| 2019/0318457 | A1* | 10/2019 | Mao | G06T 5/50 |
| 2019/0356842 | A1 | 11/2019 | Shimada | |
| 2019/0370974 | A1* | 12/2019 | Kobayashi | G06T 5/20 |
| 2020/0175651 | A1 | 6/2020 | Zhang et al. | |
| 2021/0073953 | A1 | 3/2021 | Lee | |
| 2021/0150681 | A1* | 5/2021 | Sytnik | G06T 5/50 |
| 2022/0237813 | A1 | 7/2022 | Feng et al. | |
| 2023/0319285 | A1 | 10/2023 | Shanmugam et al. | |
| 2023/0326028 | A1 | 10/2023 | Zhang et al. | |
| 2024/0177414 | A1 | 5/2024 | Lee et al. | |

OTHER PUBLICATIONS

Combined Search and Examination Report received in United Kingdom Application No. GB2407655.6 dated Oct. 10, 2024.

Kumar, H., Yadav, AS., Gupta, S., & Venkatesh, K. S. (2018). Depth map estimation using defocus and motion cues. IEEE Transactions on Circuits and Systems for Video Technology, 29(5), 1365-1379.

Lee, J. Y., & Park, R. H. (2017). Depth estimation from light field by accumulating binary maps based on foreground-background separation. IEEE Journal of Selected Topics in Signal Processing, 11 (7), 955-964.

Song, Wonseok. (2016). Depth Map Generation Using Defocus Blur Estimator and its Confidence (Doctoral dissertation) Department of Electrical Engineering and Computer Science College of Engineering Seoul National University. 105 Pages.

Tung, S.S., & Hwang, W. L. (2017). Multiple depth layers and all-in-focus image generations by blurring and deblurring operations. Pattern Recognition, 69, 184-198.

U.S. Appl. No. 18/536,822, Sep. 11, 2025, Notice Allowance.

* cited by examiner

*Fig. 15*
1502
1504
1510
1506
1508
1500
Edit
Auto
B&W
Lens Blur
Apply
Blur Amount
50
Bokeh
Boost
50
Focal Range
0
29
Visualize Depth
Refine

Fig. 18
1800
1802
Edit
Auto
B&W
Lens Blur
Apply
Blur Amount
77
Bokeh
Boost
68
Focal Range
0
29
Visualize Depth
Refine
Focus
Blur
Amount
Brush Size
Feather
Flow
Auto Mask

INTERACTIVELY ADJUSTING LIGHT SOURCE BRIGHTNESS IN DIGITAL IMAGES WITH NON-DESTRUCTIVE SYNTHETIC LENS BLUR

CROSS-REFERENCE TO RELATED APPLICATIONS

This application claims priority to and the benefit of U.S. Provisional Patent Application No. 63/585,369, filed on Sep. 26, 2023, which is incorporated herein by reference in its entirety.

BACKGROUND

Improvements to computer processing technologies have led to significant advancements in the field of image processing. In particular, many industries have implemented various image editing tools and processes for generating and manipulating digital images for a variety of uses. Additionally, computer-assisted image editing tools have increased the accessibility of digital image editing applications for a larger audience of users with different levels of expertise. For example, many mobile devices (e.g., smartphones with digital cameras) provide users with tools for editing digital images to imitate effects commonly achieved with optical zoom lenses, such as zoom or focus effects. Due to the variety of captured subjects and scenes in digital images, the difficulties in identifying boundaries between objects in digital images, and the variety of depths of object placements within digital images, modifying digital images to accurately represent lens blur effects is a challenging task. Conventional systems have a number of shortcomings with regard to accurately representing synthetic depth-based or blur-based effects in digital images.

SUMMARY

One or more embodiments described herein provide benefits and/or solve one or more problems in the art with systems, methods, and non-transitory computer-readable media that implement artificial intelligence models to facilitate flexible and efficient scene-based image editing. To illustrate, in one or more embodiments, a system utilizes one or more machine learning models to learn/identify characteristics of a digital image, anticipate potential edits to the digital image, and/or generate supplementary components that are usable in various edits. Accordingly, the system gains an understanding of the two-dimensional image as if it were a real scene, having distinct semantic areas reflecting real-world (e.g., three-dimensional) conditions. Further, the system enables the two-dimensional image to be edited so that the changes automatically and consistently reflect the corresponding real-world conditions without relying on additional user input. The system also provides realistic editing of two-dimensional objects in two-dimensional images based on three-dimensional characteristics of two-dimensional scenes, such as by generating one or more three-dimensional meshes based on the two-dimensional images. Thus, the system facilitates flexible and intuitive editing of digital images while efficiently reducing the user interactions typically required to make such edits.

BRIEF DESCRIPTION OF THE DRAWINGS

Various embodiments will be described and explained with additional specificity and detail through the use of the accompanying drawings.

DETAILED DESCRIPTION

Figure 1:
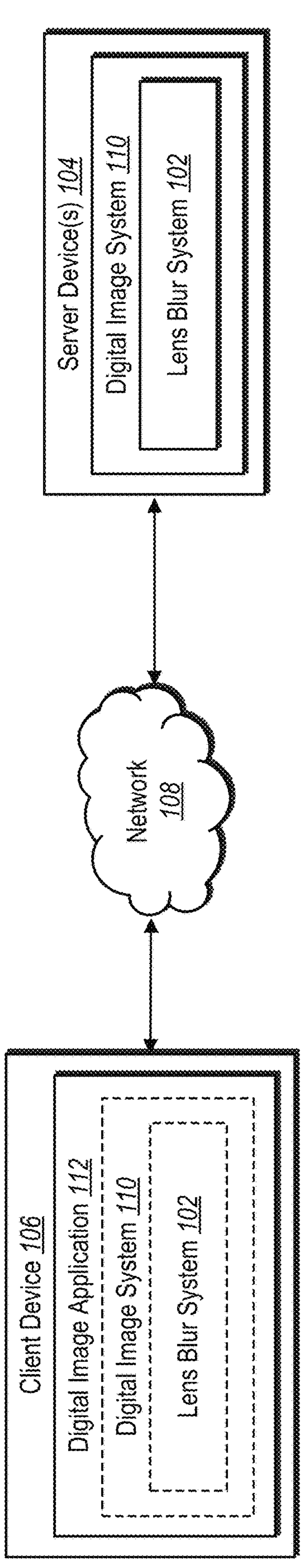
FIG. 1 illustrates an example environment in which a lens blur system operates in accordance with one or more implementations.

One or more embodiments of the present disclosure include a lens blur system that utilizes a non-destructive lens blur pipeline to generate synthetic depth-based lens blur effects. In particular, the lens blur system utilizes the non-destructive lens blur pipeline to perform high quality in-focus edge rendering, interactive depth map refinement, and/or interactive adjustment of brightness for light sources in connection with depth-based blurring effects. For example, the lens blur system utilizes one or more estimated depth maps generated from a single digital image to apply varying amounts of blur to different regions of the digital image according to the estimated depth values. Furthermore, the lens blur system provides tools within a graphical user interface for interactively indicating portions of the digital image to blur or unblur (e.g., in a non-destructive blur pipeline) and/or to boost light source luminance. Specifically, the non-destructive processing pipeline involves the lens blur system applying editable lens blur effects to the digital image (e.g., by inserting blurring effects into the digital image or modifying lens blur effects previously applied by the lens blur system).

As mentioned, in one or more embodiments, the lens blur system generates a lens blur effect for a digital image via a non-destructive lens blur pipeline. Specifically, the lens blur system utilizes a depth map of a digital image to generate a focal matte representing an in-focus range of depth values corresponding to a selected focus region of the digital image. For example, the lens blur system provides one or more tools for selecting a specific range of depth values corresponding to a focus relative to the depth map. The lens blur system also generates the focal matte by identifying edges corresponding to discontinuities in the depth map to refine a focus mask based on the selected focus region.

Additionally, in one or more embodiments, the lens blur system generates a layered depth map of the digital image. In particular, the lens blur system generates a set of foreground depth values and a set of background depth values for pixels across the digital image. For example, the lens blur system hallucinates foreground depth values for portions of the digital image outside an area masked by the focal matte. The lens blur system also hallucinates background depth values inside the area masked by the focal matte. The lens blur system combines the foreground depth values and the background depth values into a single depth map (e.g., the layered depth map).

In some embodiments, the lens blur system utilizes the layered depth map and the focal matte to render the digital image with a lens blur effect. For instance, the lens blur system utilizes the focal matte to determine fused depth values by interpolating the foreground and background depth values in the layered depth map. Additionally, the lens blur system utilizes the fused depth values to determine parameters for a splatting operation to render the digital image with the lens blur effect.

In at least some embodiments, the lens blur system provides tools for customizing or correcting various depth values in a lens blur effect for a digital image. Specifically, the lens blur system utilizes a fused depth map generated from a layered depth map and a focal matte of the digital image to modify depth values of one or more selected portions. For example, the lens blur system determines one or more selected portions in response to a user interaction with the selected portion(s) (e.g., with a brushstroke or dab or other selection operation). The lens blur system also determines a selected correction mode for modifying the depth values of the selected portion(s).

To illustrate, in connection with detecting a focus mode to unblur one or more selected portions of the digital image in a non-destructive processing pipeline, the lens blur system determines a focus region of the digital image. The lens blur system modifies depth values of the digital image (e.g., in the layered depth map and/or the fused depth map) by moving the selected portions toward the foreground or toward the background to unblur the selected portions according to the focus region. Additionally, in connection with detecting a blur mode to blur one or more selected portions of the digital image, the lens blur system uses the focus region of the digital image to determine whether to adjust the depth values of the portions toward the foreground or toward the background to blur the selected portions according to the focus region. Accordingly, the lens blur system provides tools for making corrections to the depth map(s) of the digital image via general selections of portions and based on information of surrounding portions of the digital image.

In additional embodiments, the lens blur system provides tools for adjusting light sources of a digital image in connection with a lens blur effect. In particular, the lens blur system generates a highlight guide image indicating light sources in the digital image. For example, the lens blur system generates the highlight guide image via the generation of various masks based on detecting light sources (e.g., via edges) in a luminance map of the digital image. Alternatively, the lens blur system generates the highlight guide image utilizing a trained machine-learning model according to ground-truth highlight guide images of digital images. The lens blur system stores the highlight guide image with the digital image for present or later access in connection with applying a lens blur effect in one or more digital image applications.

In one or more embodiments, during rendering of the digital image, the lens blur system utilizes the highlight guide image to boost luminance of pixels corresponding to detected light sources. Specifically, the lens blur system extracts luminance values of the pixels in the digital image and determines a luminance boost value based on the highlight guide image, blur values for the pixels, and/or highlight values of the pixels from the highlight guide image. Additionally, the lens blur system provides tools to modify the luminance boost value according to a selected boost amount. Accordingly, the lens blur system provides tools to apply realistic blur effects to light sources in a digital image based on extracted information in the digital image and user interactions with various tools.

Some conventional systems that provide synthetic lens blur effects for digital images lack the accuracy and flexibility of the lens blur system. In particular, some conventional systems utilize estimated depth maps of digital images to generate lens blur effects by blurring pixels (e.g., via Gaussian blur operations) according to the corresponding depths of the pixels. Although such conventional systems provide approximate blur effects in digital images by utilizing estimated depth maps, the resulting blurring effects often inaccurately simulate realistic lens blur. For example, the conventional systems often produce inaccurate blurring, blooming, or image artifacts at edges and depth transitions with discontinuities between foreground elements and background elements. The inaccurate results are often due to inaccuracies in the estimated depth maps and the difficulty that many image processing operations have in accurately detecting depths at transition regions.

Furthermore, the conventional systems lack flexibility in customizing lens blur effects in digital images. Specifically, by relying on per-pixel blurring according to estimated depth maps of digital images, the conventional systems produce generally consistent blurring of out-of-focus elements of digital images. The conventional systems, however, lack certain capabilities for refining or customizing lens blur effects. Accordingly, the conventional systems do not have the ability to apply certain additional modifications or to otherwise customize/correct blur effects in digital images according to contextual foreground and background depth information throughout the digital images.

The lens blur system provides a number of advantages over conventional systems in connection with generating lens blur effects in digital images. For example, the lens blur system improves the accuracy of a computing system that generates lens blur effects in digital images. In contrast to conventional systems that merely utilize estimated depth maps to apply per-pixel blur operations to digital images, the lens blur system leverages a multi-layered depth map with selected in-focus depth ranges to refine depth-based blur effects. In particular, the lens blur system provides in-focus edge rendering in a non-destructive lens blur pipeline by generating a focal matte according to a selectable range of in-focus depth values with fused foreground/background depth values to improve splatting operations during rendering.

In some embodiments, the lens blur system also improves accuracy of lens blur effects by improving accuracy of light source blurring in depth-based blurring operations of digital images. Specifically, the lens blur system utilizes luminance edge detection to identify light sources (e.g., point light sources) in digital images and generate highlight guide images to store with the digital images. The lens blur system utilizes the highlight guide image with user inputs via graphical user interface tools to provide accurate, consistent rendering of non-destructive blur edits at various resolutions and/or across a plurality of digital image applications. More specifically, the lens blur system boosts pixels corresponding to light sources in a digital image via a non-destructive processing pipeline utilizing layered depth information with customizable parameters to provide realistic blur and visibility of light sources having their light scattered via lens blur effects.

Furthermore, in one or more embodiments, the lens blur system provides improved flexibility in applying synthetic lens blur effects to digital images. In particular, in contrast to conventional systems that merely utilize an estimated depth map of a digital image to apply per-pixel Gaussian blur effects, the lens blur system utilizes a plurality of depth maps with user input via various blur customization tools to provide a variety of varied lens blur effects. For instance, the lens blur system provides customization of in-depth range values for indicating specific focus ranges of digital images. Furthermore, the lens blur system provides user customization of focus regions to correct errors in lens blur effects resulting from inaccurate depth map estimation. The lens blur system also provides customization of light source blurring via various light source boosting tools to accurately represent lens blur effects on light sources detected within digital images.

Turning now to the figures, FIG. 1 includes an embodiment of a system environment 100 in which a lens blur system 102 is implemented. In particular, the system environment 100 includes server device(s) 104 and a client device 106 in communication via a network 108. Moreover, as shown, the server device(s) 104 include a digital image system 110, which includes the lens blur system 102. Additionally, the client device 106 includes a digital image application 112, which optionally includes the digital image system 110 and the lens blur system 102.

As shown in FIG. 1, the client device 106 or the server device(s) 104 include or host the digital image system 110. The digital image system 110 includes, or is part of, one or more systems that implement digital image editing operations. For example, the digital image system 110 provides tools for performing various operations on digital images. To illustrate, the digital image system 110 communicates with the client device 106 via the network 108 to provide the tools for display and interaction via the digital image application 112 at the client device 106. Additionally, in some embodiments, the digital image system 110 receives requests to access digital images stored (e.g., at the server device(s) 104 or at another device such as a digital content database) and/or requests to store digital images. In some embodiments, the digital image system 110 receives interaction data for viewing, generating, or editing a digital image or data associated with the digital image, processes the interaction data (e.g., to view, generate, or edit a digital image), and provides the results of the interaction data for display via the digital image application 112 or to a third-party system.

In one or more embodiments, a digital image includes a digital raster image with image content represented one or more objects. For example, a digital image includes one or more foreground and/or background objects within a scene. Additionally, in some embodiments, a digital image includes a captured image of a real-world scene. Alternatively, a digital image includes a fully or partially synthetically (e.g., computer) generated image of a fully or partially synthetic scene. In some embodiments, a digital image includes a modified version of another digital image (e.g., in response to one or more digital image editing operations).

According to one or more embodiments, the digital image system 110 utilizes the lens blur system 102 to generate synthetic lens blur effects for digital images in a non-destructive processing pipeline (e.g., by applying blur effects during rendering). In particular, the digital image system 110 utilizes the lens blur system 102 to determine and utilize multi-layered depth values for pixels of digital images and indicated portions of the digital images to generate realistic lens blur effects in out-of-focus areas. For example, as illustrated in more detail below, the digital image system 110 utilizes the lens blur system 102 to provide accurate lens blur for depth discontinuities in digital images. Additionally, the digital image system 110 utilizes the lens blur system 102 to correct or refine depth values in connection with applying lens blur effects to digital images. Furthermore, the digital image system 110 utilizes the lens blur system 102 to provide light source blurring (e.g., via luminance boosting) in digital images via the generation and use of highlight guide images. The digital image system 110 thus utilizes the lens blur system 102 to synthetically produce realistic lens blur effects in digital images with tools that allow for increased control over the in-focus range of depth values and other customizable parameters.

As illustrated in FIG. 1, the lens blur system 102 can be implemented on the client device 106 or on the server device(s) 104. In particular, in some implementations, the lens blur system 102 on the server device(s) 104 supports the lens blur system 102 on the client device 106. For instance, the server device(s) 104 generates or obtains the lens blur system 102 for the client device 106 (e.g., as part of a software application or suite). The server device(s) 104 provides the lens blur system 102 to the client device 106 for performing digital image editing at the client device 106. In other words, the client device 106 obtains (e.g., downloads) the lens blur system 102 from the server device(s) 104. At this point, the client device 106 is able to utilize the lens blur system 102 to edit digital images independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the lens blur system 102 being implemented by a particular component and/or device within the system environment 100, the lens blur system 102 is implemented, in whole or in part, by other computing devices and/or components in the system environment 100. For example, in some embodiments, the server device(s) 104 include or host the digital image system 110 and/or the lens blur system 102.

To illustrate, the lens blur system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to perform digital image processing operations (e.g., difference captioning) and, in response, the lens blur system 102 or the digital image system 110 on the server device(s) 104 performs operations to generate lens blur effects for a digital image. The server device(s) 104 provide the output or results of the operations to the client device 106.

In one or more embodiments, the server device(s) 104 include a variety of computing devices, including those described below with reference to FIG. 28. For example, the server device(s) 104 includes one or more servers for storing and processing data associated with editing digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 28). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with digital images. In some embodiments, the client device 106 also performs functions for generating, capturing, or accessing data to provide to the digital image system 110 and the lens blur system 102 in connection with digital image editing. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 28.

Figure 2:
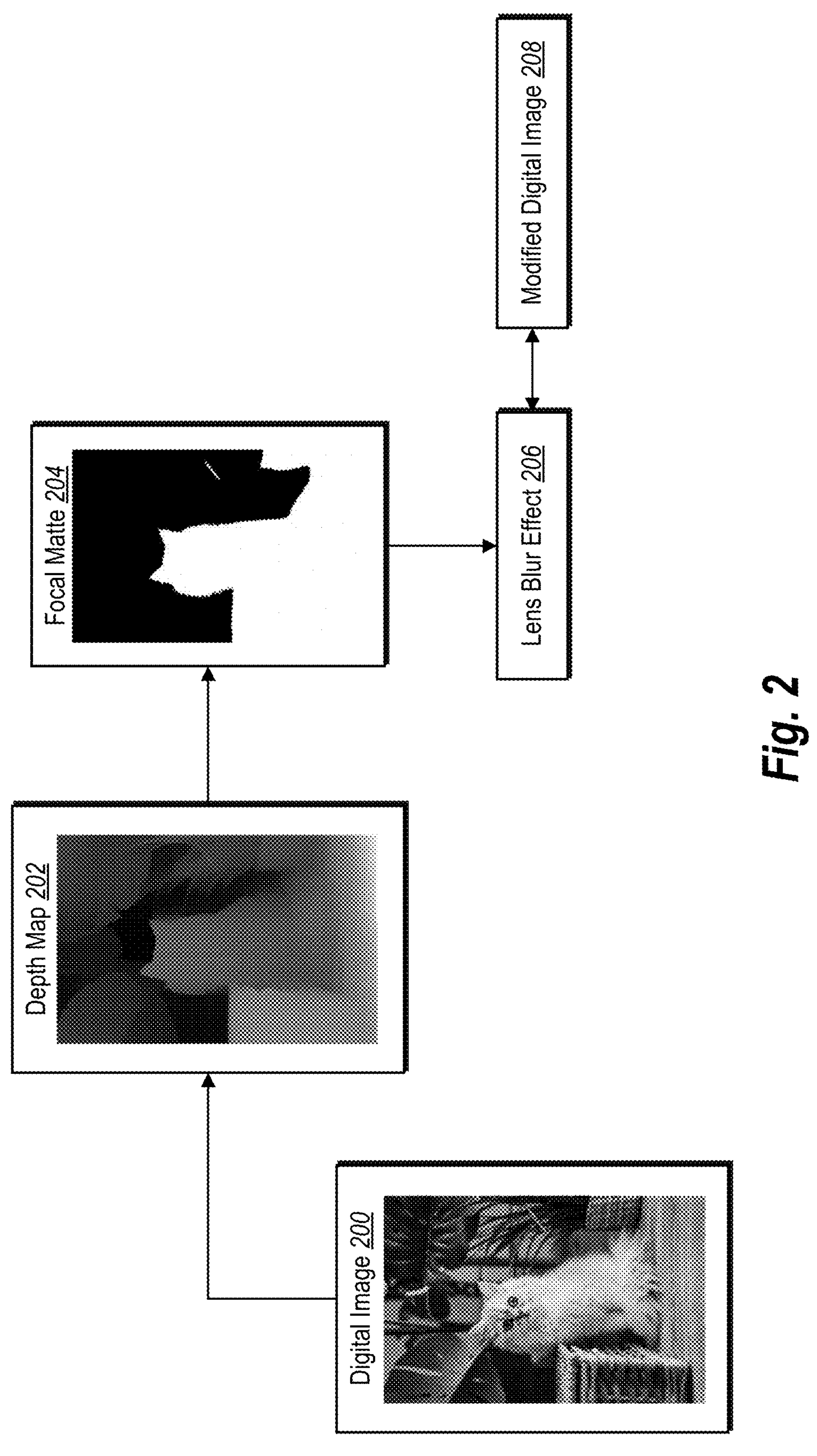
FIG. 2 illustrates an overview diagram of the lens blur system applying a lens blur effect to a digital image in accordance with one or more implementations.

As mentioned, the lens blur system 102 provides tools for generating realistic lens blur effects in digital images. Specifically, the lens blur system 102 utilizes estimated depth values of pixels in a digital image and one or more selected regions to apply various lens blur to a digital image. FIG. 2 illustrates an overview of the lens blur system 102 utilizing a depth map and a focal matte of a digital image to apply a lens blur effect to the digital image.

In one or more embodiments, as illustrated in FIG. 2, the lens blur system 102 determines a digital image 200 to modify via one or more depth-based blur operations. In particular, as mentioned, the digital image 200 includes a photograph or other image including various objects organized in a scene. For instance, the digital image 200 includes one or more foreground objects and one or more background objects.

Additionally, as illustrated in FIG. 2, the lens blur system 102 determines a depth map 202 of the digital image 200 by estimating the depth map 202 including depth values corresponding to pixels of the digital image. For example, the lens blur system 102 utilizes a depth estimation machine-learning model to generate the depth map 202 for the digital image 200. Alternatively, the lens blur system 102 utilizes data from a camera that captured the digital image 200 to generate (or otherwise obtain) the depth map 202 of the digital image 200. The depth map 202 includes depth values for each of the pixels in the digital image 200 such that the lens blur system 102 determines an approximate depth of each object (and each portion of an object) relative to a viewpoint (e.g., a camera view) of the digital image 200.

In one or more embodiments, the lens blur system 102 also determines a focal matte 204 utilizing the depth map 202. Specifically, the lens blur system 102 determines the focal matte 204 to indicate specific portions of the digital image 200 that are in focus. For example, as described in more detail with respect to FIG. 3, the lens blur system 102 utilizes the depth map 202 with one or more selected portions of the digital image 200 (e.g., a selected range of in-focus depth values) to generate the focal matte 204. To illustrate, the lens blur system 102 generates the focal matte 204 in a matting operation (e.g., via a matting model) that refines edges and captures details of objects with soft or irregular boundaries (e.g., hair) in connection with a customized in-focus range of depth values of content in the digital image 200.

In at least some embodiments, the lens blur system 102 utilizes the depth map 202 and/or the focal matte 204 to generate a lens blur effect 206 for the digital image 200. In particular, the lens blur system 102 utilizes one or more lens blur operations to generate a depth-based blur effect to the digital image 200. For instance, as described in more detail below with respect to FIGS. 5, 10, 14, and 17-20, the lens blur system 102 applies the lens blur effect 206 by blurring or unblurring one or more portions of the digital image 200 and/or boosting highlights caused by one or more light switches in the digital image 200. As also described in more detail below, the lens blur system 102 utilizes one or more additional masks, depth maps, or guide images to apply the lens blur effect 206 to the digital image 200. The lens blur system 102 thus generates a modified digital image 208 by rendering the digital image 200 with the lens blur effect 206.

As mentioned, the lens blur system 102 modifies digital images to include lens blur effects via a non-destructive processing pipeline. In particular, the lens blur system 102 utilizes depth values of pixels in a digital image with an in-focus range of depth values to determine parameters for a splatting operation for rendering the digital image with a lens blur effect. As further mentioned, FIG. 3 illustrates a process of generating a focal matte for the digital image to represent an in-focus range of depth values for a digital image.

Figure 3:
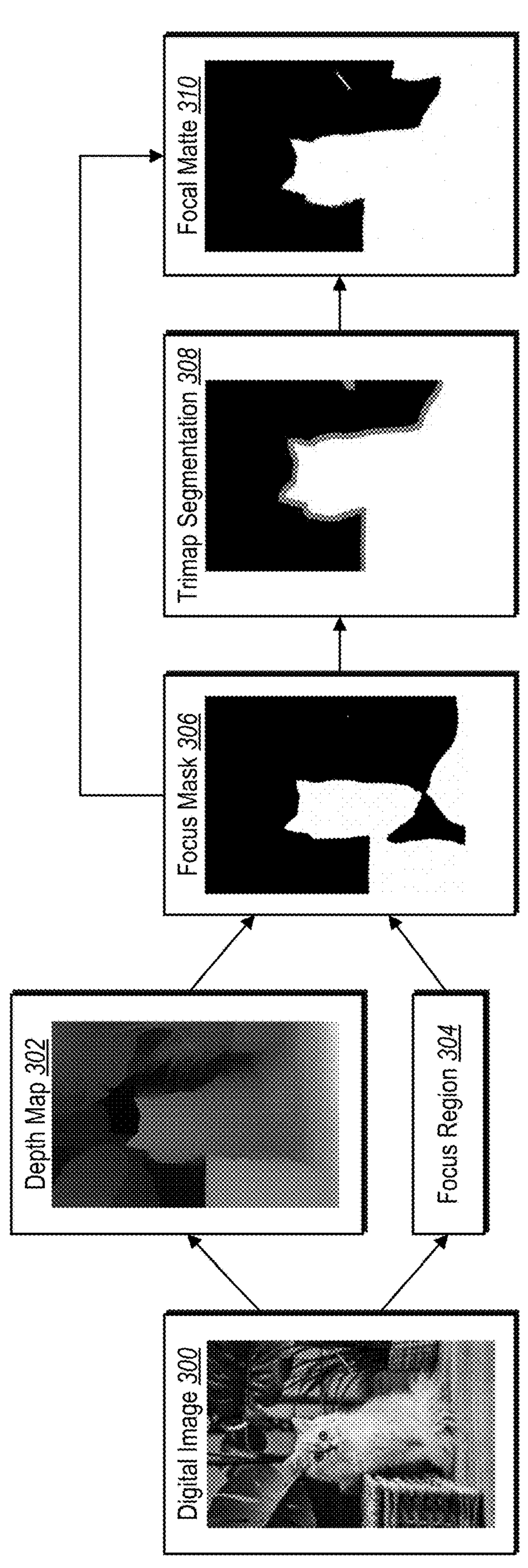
FIG. 3 illustrates a diagram of a process for generating a focal matte for a digital image in accordance with one or more implementations.

In one or more embodiments, as illustrated in FIG. 3, the lens blur system 102 determines a digital image 300 to render with a lens blur effect. For example, the lens blur system 102 receives a request to apply the lens blur effect to the digital image 300, such as via a digital image application for viewing and editing digital images. In response to the request, the lens blur system 102 obtains a depth map 302 for the digital image 300. As mentioned, the lens blur system 102 determines the depth map 302 including depth values of pixels in the digital image 300 relative to a viewpoint (e.g., a camera viewpoint) of the digital image 300.

For instance, in some embodiments, the lens blur system 102 utilizes a monocular depth estimation model to generate the depth map 302. To illustrate, the depth estimation model includes a single image depth estimation model (SIDE) with a convolutional neural network architecture. In additional embodiments, the lens blur system 102 utilizes a transformer model and/or leverage self-attention layers to generate the depth map 302. To illustrate, the lens blur system 102 utilizes a depth estimation model as described in Generating Depth Images Utilizing A Machine-Learning Model Built From Mixed Digital Image Sources And Multiple Loss Function Sets, U.S. patent application Ser. No. 17/186,436, filed Feb. 26, 2021, which is incorporated herein by reference in its entirety. Accordingly, the lens blur system 102 utilizes the depth estimation machine-learning model to process the digital image 300 and generate the depth map 302.

In one or more embodiments, the lens blur system 102 also determines a focus region 304 indicating one or more portions of the digital image 300 as "in focus." Specifically, the focus region includes a specific depth (or range of depths) corresponding to one or more objects in the digital image on which to focus in a synthetic lens blur effect. For example, the lens blur system 102 determines the focus region 304 in response to a user interaction with the one or more portions of the digital image 300. Alternatively, the lens blur system 102 determines the focus region 304 in connection with an object detection operation and/or a default focus region (e.g., corresponding to a nearest depth value or a nearest detected foreground object).

In response to determining the depth map 302 and the focus region 304, the lens blur system 102 determines a focus mask 306 for the digital image 300. For instance, the lens blur system 102 generates a binary mask indicating one or more foreground regions and one or more background regions. To illustrate, the lens blur system 102 generates the focus mask 306 by thresholding depth values in the depth map 302 according to the focus region 304. In particular, the lens blur system 102 thresholds in-focus depths to a first value (e.g., 1) and out-of-focus depths to a second value (e.g., 0). Accordingly, the focus mask 306 includes an initial estimate of foreground portions and background portions of the digital image 300 based on the estimated depth values in the depth map 302.

In one or more embodiments, the lens blur system 102 utilizes one or more additional processes to modify the initial estimates of the foreground portions and the background portions in the focus mask 306 by refining details of edges in the depth map 302. For instance, the lens blur system 102 utilizes a machine-learning model trained to refine edges of the focus mask 306 to better match the content in the digital image 300 (e.g., by capturing details of hair or other irregular boundaries). To illustrate, the lens blur system 102 utilizes an edge detection operation to generate a trimap segmentation 308 from the depth map 302 (and in some instances, from the focus mask 306 as an additional input with the depth map 302). Specifically, the trimap segmentation 308 comprises information indicating discontinuities in the depth map 302 via an unknown region, which corresponds to pixels that may include depth values in the foreground or the background.

In one or more embodiments, the lens blur system 102 generates the trimap segmentation 308 by flooding portions (e.g., extends in-focus values) of the focus mask 306 until encountering either an edge in the depth map 302 or an extended focal range. In some embodiments, the lens blur system 102 further generates the trimap segmentation 308 by eroding and dilating the resulting flooded portions of the focus mask 306 to create the unknown region. The lens blur system 102 combines the unknown region with the flooded portions of the focus mask 306 to create the trimap segmentation 308, which thus includes a foreground region, a background region, and the unknown region. In some embodiments, the lens blur system utilizes a trimap segmentation model to generate a trimap segmentation, as described in AUTOMATICALLY GENERATING A TRIMAP SEGMENTATION FOR A DIGITAL IMAGE BY UTILIZING A TRIMAP GENERATION NEURAL NETWORK, U.S. Pat. No. 11,393,100, filed Aug. 7, 2020, which is herein incorporated in its entirety.

In response to generating the trimap segmentation 308, the lens blur system 102 generates a focal matte 310 for the digital image 300. In particular, the lens blur system 102 blends (or otherwise combines) the trimap segmentation 308 with the focus mask 306 to generate the focal matte 310. Accordingly, the focal matte 310 includes masked areas indicating in-focus regions corresponding to the focus region 304 with alpha values corresponding to blended boundary regions in the depth map 302. Furthermore, as noted above, by flooding the focus region 304 during trimap generation, the lens blur system 102 utilizes a matting model that applies to in-focus pixels as well as to slightly defocused pixels.

Figure 4:
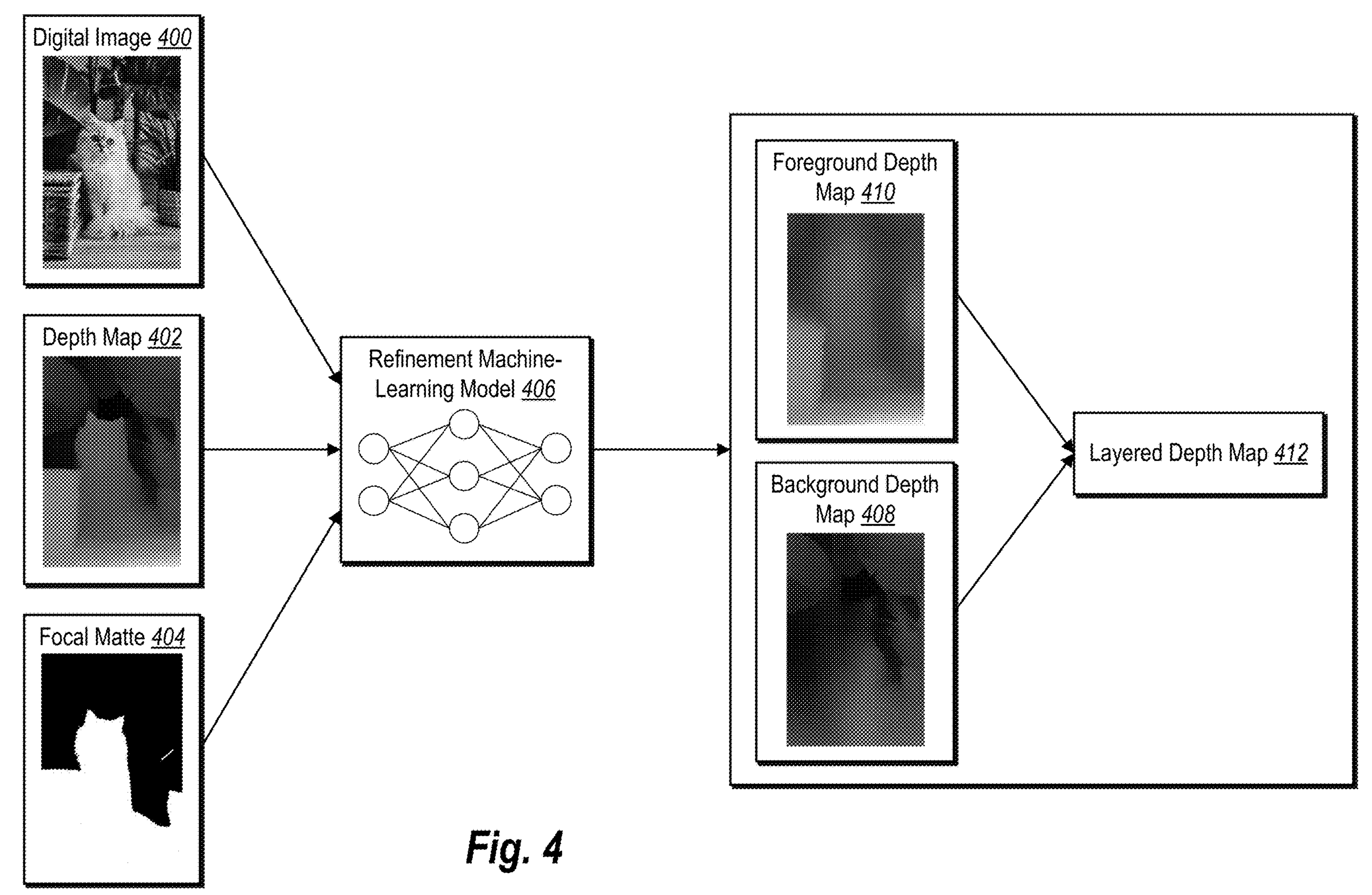
FIG. 4 illustrates a diagram of a process for generating a layered depth map for a digital image in accordance with one or more implementations.

In one or more embodiments, the lens blur system 102 utilizes depth information and a focal matte corresponding to a selected focal region of a digital image to generate a layered depth map including background and foreground depth information across the entirety of the digital image. As illustrated in FIG. 4, the lens blur system 102 utilizes machine-learning to generate foreground and background information for various portions of the digital image utilizing depth values of the digital image and selected in-focus portions of the digital image. As described in more detail below, the lens blur system 102 utilizes a mask-guided machine-learning model to determine the foreground and background information.

As illustrated in FIG. 4, the lens blur system 102 provides a digital image 400, a depth map 402 of the digital image 400, and a focal matte 404 of the digital image 400 to a refinement machine-learning model 406. In one or more embodiments, the lens blur system 102 utilizes a machine-learning model as described in UTILIZING MACHINE-LEARNING MODELS TO GENERATE REFINED DEPTH MAPS WITH SEGMENTATION MASK GUIDANCE, U.S. patent application Ser. No. 17/658,873, filed Apr. 12, 2022, which is herein incorporated by reference in its entirety. Specifically, as mentioned, the lens blur system 102 hallucinates foreground information for out-of-focus portions and background information for in-focus portions across the digital image.

To illustrate, the lens blur system 102 utilizes the refinement machine-learning model 406 to determine a background depth map 408 and a foreground depth map 410 based on the digital image 400, the depth map 402, and the focal matte 404. In particular, the lens blur system 102 utilizes the focal matte 404 as a guide mask for the refinement machine-learning model 406. For example, the lens blur system 102 utilizes the refinement machine-learning model 406 to hallucinate background depth values within an area masked by the focal matte 404 corresponding to an in-focus region. The lens blur system 102 also utilizes the refinement machine-learning model 406 to hallucinate foreground depth values outside of the area masked by the focal matte 404 corresponding to an out-of-focus region.

Accordingly, the lens blur system 102 generates the background depth map 408 to include background depth values for pixels across the digital image 400 including areas not visible in the digital image 400 (e.g., behind one or more foreground objects). Furthermore, the lens blur system 102 generates the foreground depth map 410 to include foreground depth values for the pixels across the digital image 400 including areas that visibly correspond to background scenery. The lens blur system 102 generates the layered depth map 412 including the background depth map 408 and the foreground depth map 410. To illustrate, the layered depth map 412 includes a data structure (e.g., a vector or matrix) including background depth values and foreground depth values for the pixels in the digital image 400. Alternatively, the layered depth map 412 includes an index mapping values from the background depth map 408 and the foreground depth map 410 to each pixel.

Figure 5:
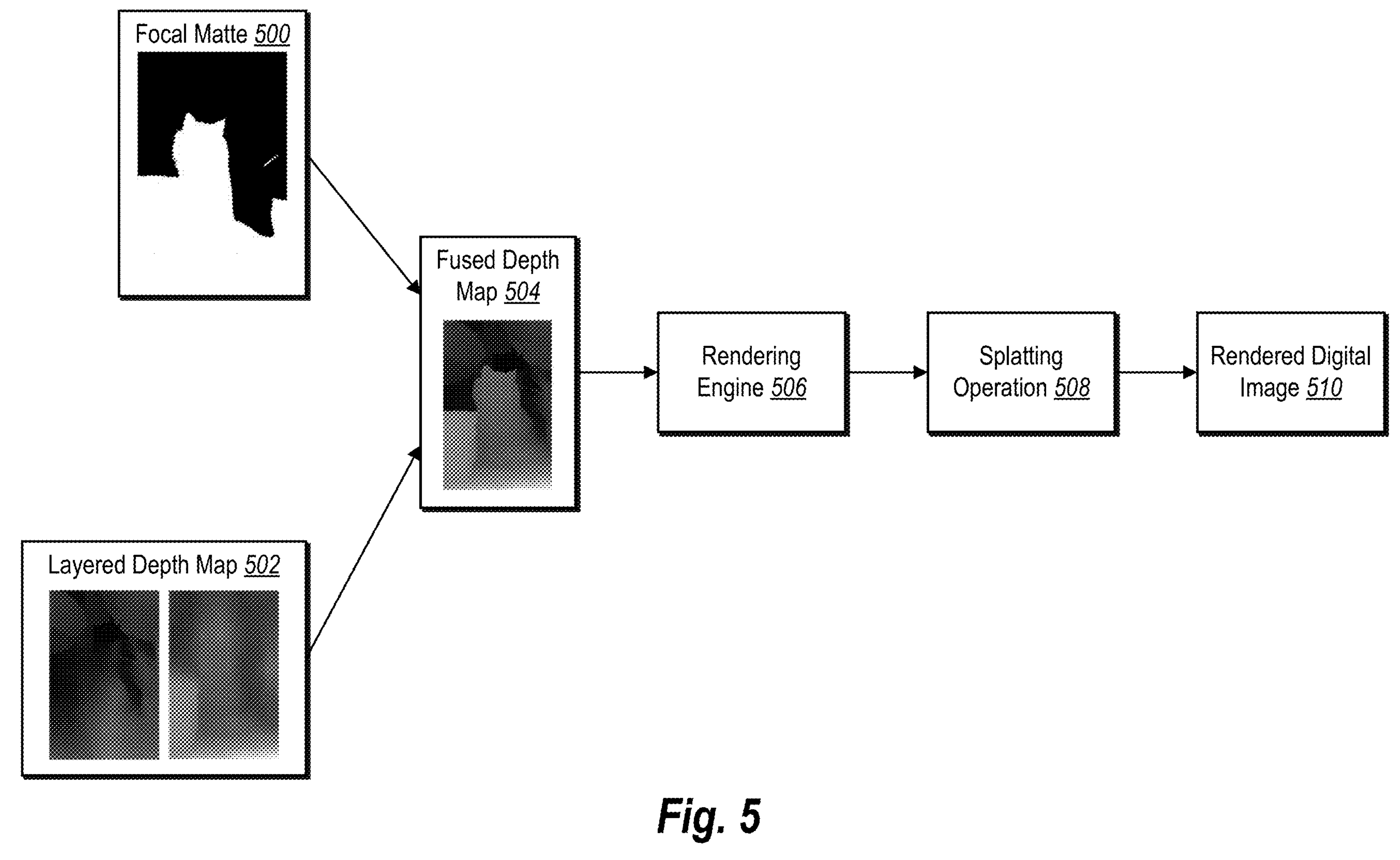
FIG. 5 illustrates a diagram of a process for rendering a lens blur effect for a digital image in accordance with one or more implementations.

In one or more embodiments, the lens blur system 102 utilizes depth information from a layered depth map and a range of in-focus depth values to render a digital image with a lens blur effect. FIG. 5 illustrates a process in which the lens blur system 102 renders a digital image with a lens blur effect in a non-destructive processing pipeline via splatting. Specifically, as illustrated in FIG. 5, the lens blur system 102 utilizes a focal matte and a layered depth map to determine splatting parameters for rendering the lens blur effect in the digital image.

As illustrated in FIG. 5, the lens blur system 102 utilizes a focal matte 500 and a layered depth map 502 of a digital image to apply a lens blur effect to a digital image. For example, the lens blur system 102 determines the focal matte 500 for a digital image as described above with respect to FIG. 3. Additionally, the lens blur system 102 determines the layered depth map 502 for the digital image as described above with respect to FIG. 4.

In one or more embodiments, the lens blur system 102 generates a fused depth map 504 based on the focal matte 500 and the layered depth map 502. In particular, the fused depth map 504 includes a combination of foreground depth values and background depth values from the layered depth map 502. For example, the lens blur system 102 generates the fused depth map 504 by combining a background depth value and a foreground depth value of a pixel according to a position of the pixel in the focal matte 500. To illustrate, the lens blur system 102 utilizes a focal matte value for the pixel from the focal matte 500 to linearly interpolate between the background depth value and the foreground depth value of the pixel (e.g., by weighting the combination toward the focal matte value). Accordingly, the lens blur system 102 can consider whether a particular pixel is in an in-focus region or outside the in-focus region when generating a fused depth value for the pixel.

Additionally, in some embodiments, the lens blur system 102 utilizes a rendering engine 506 to render a lens blur effect in the digital image. Specifically, the lens blur system 102 provides the fused depth map 504 to the rendering engine 506. In some implementations, the rendering engine 506 includes an engine within a digital image application that utilizes filters and/or other editing information for a digital image to determine how the digital image is presented or rendered within a graphical user interface. Accordingly, the rendering engine 506 utilizes a splatting operation 508 that combines various textures (e.g., a digital image and blur parameters) utilizing point spread functions to produce a rendered digital image 510 with a lens blur effect applied to the digital image.

In one or more embodiments, the lens blur system 102 utilizes the rendering engine 506 to implement the splatting operation 508 by using the fused depth map 504 to determine blur kernels for the splatting operation 508. For instance, the splatting operation 508 involves determining splat sizes or weights based on the fused depth values. To illustrate, in response to determining that the focal matte value of a pixel is less than 1 and greater than a threshold value E above 0, the lens blur system 102 modulates the splat weight by the focal matte value. Furthermore, in response to determining that the focal matte value of a pixel is 1 or 0 (or less than $\epsilon$), the lens blur system 102 does not modulate the splat weight by the focal matte value.

In one or more embodiments, the splatting operation 508 utilizes point spread functions that describe the response to a single white pixel for a given radius, along with other characteristics (e.g., shape, border intensity, aspect, and orientation). The lens blur system 102 normalizes the intensity of the point spread functions to preserve energy (e.g., without creating additional light). Additionally, in some embodiments, the lens blur system 102 reduces the amount of splatting with sparse point spread functions by integrating splat values corresponding to pixels from the gradient domain according to the splat sizes/weights in a single pass to obtain the rendered digital image 510. Furthermore, in some embodiments, the lens blur system 102 divides the depth range into a plurality of layers (e.g., a plurality of different depth ranges) for integrating depth splats separately and blending the integrated layers. For example, the lens blur system 102 utilizes one or more alpha blending and/or alpha normalization operations utilizing the integrated values of the layers to generate the rendered digital image 510.

Additionally, in one or more embodiments, the lens blur system 102 utilizes posterized blur kernels to improve processing performance of rendered lens blur effects. For example, the lens blur system 102 posterizes each blur kernel prior to determining point-spread function gradients. To illustrate, by retaining fewer unique pixel values in a posterized blur kernel, the lens blur system 102 generates a sparse gradient, which results in fewer computational operations for the blur kerel and lower computational costs while maintaining accurate blurring results in the lens blur effect.

Figure 6:
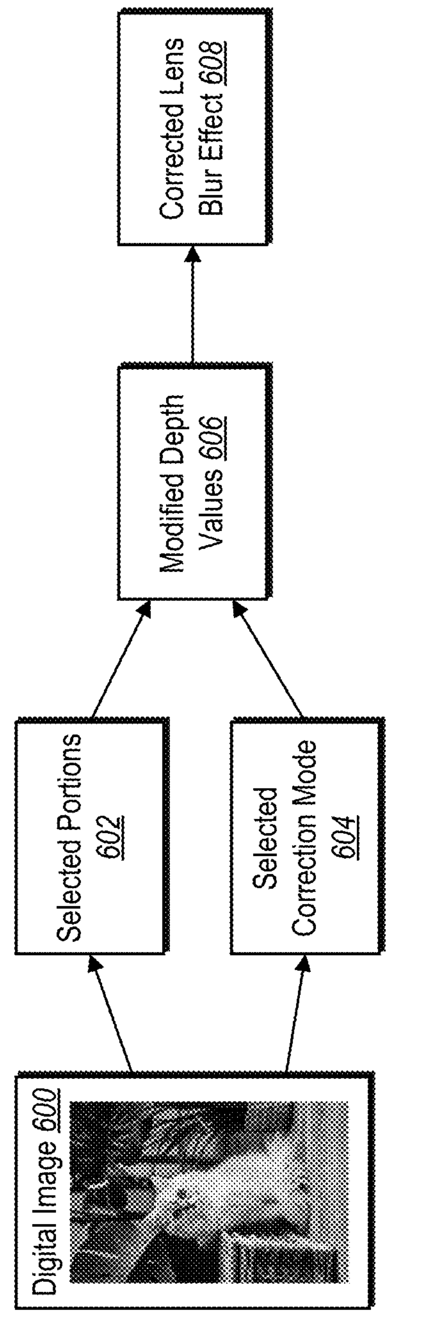
FIG. 6 illustrates a diagram of a process for correcting a lens blur effect for a digital image in response to a user interaction in accordance with one or more implementations.

As previously mentioned, the lens blur system 102 provides tools for interactively correcting or refining lens blur effects via one or more corrections to depth values associated with a digital image. FIG. 6 illustrates an overview of a process of the lens blur system 102 correcting a portion of a lens blur effect applied to a digital image. Specifically, the lens blur system 102 applies the correction by modifying depth values associated with the lens blur effect in response to various user interactions via a digital image. Furthermore, in some embodiments, the lens blur system 102 applies a series of corrections to the lens blur effect by modifying depth values in response to a series of user interactions via the digital image.

As illustrated in FIG. 6, the lens blur system 102 determines a digital image 600 in connection with a request to apply a lens blur effect to the digital image 600 (e.g., to make the depth values of a portion match the depth values of its surroundings). In one or more embodiments, the lens blur system 102 determines one or more sets of depth values associated with the digital image 600. To illustrate, the lens blur system 102 determines depth values from an initial estimated depth map, background/foreground depth values from a layered depth map, and/or fused depth values from a fused depth map, as described above.

In one or more embodiments, the lens blur system 102 determines selected portions 602 of the digital image 600 indicating one or more areas of the digital image 600 to refine, correct, or otherwise adjust a blur effect in the one or more areas. For instance, the lens blur system 102 determines the selected portions 602 in response to user interactions with one or more tools to correct a lens blur effect. To illustrate, as described in more detail with respect to FIG. 7, the lens blur system 102 determines one or more portions of one or more depth maps to modify for blurring or unblurring portions of the digital image 600 during the non-destructive processing pipeline according to a focus region of the digital image 600.

In connection with correcting or refining the depth map(s) for applying a lens blur effect to the digital image 600, the lens blur system 102 also determines a selected correction mode 604. In particular, the lens blur system 102 determines whether the selected correction mode 604 is a blur mode to blur the selected portions 602 or a focus mode to unblur the selected portions 602 in the non-destructive blur process. Accordingly, in one or more embodiments as described in connection with FIGS. 8-9, the lens blur system 102 determines how to modify the lens blur effect according to the selected correction mode 604 (e.g., based on a user input or a default correction mode).

Figure 8:
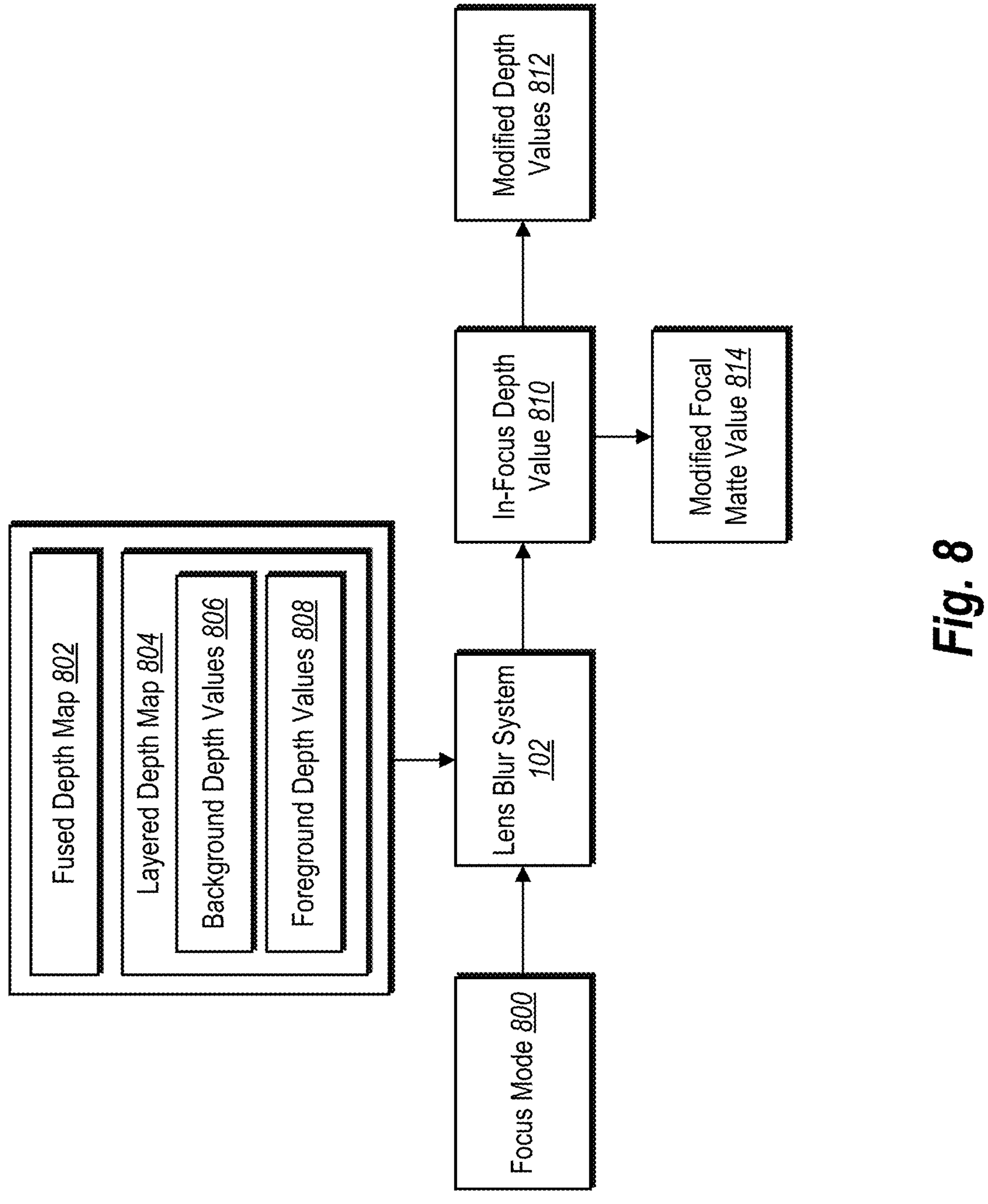
FIG. 8 illustrates a diagram of a process for modifying depth values of a digital image via a focus mode in accordance with one or more implementations.
Figure 9:
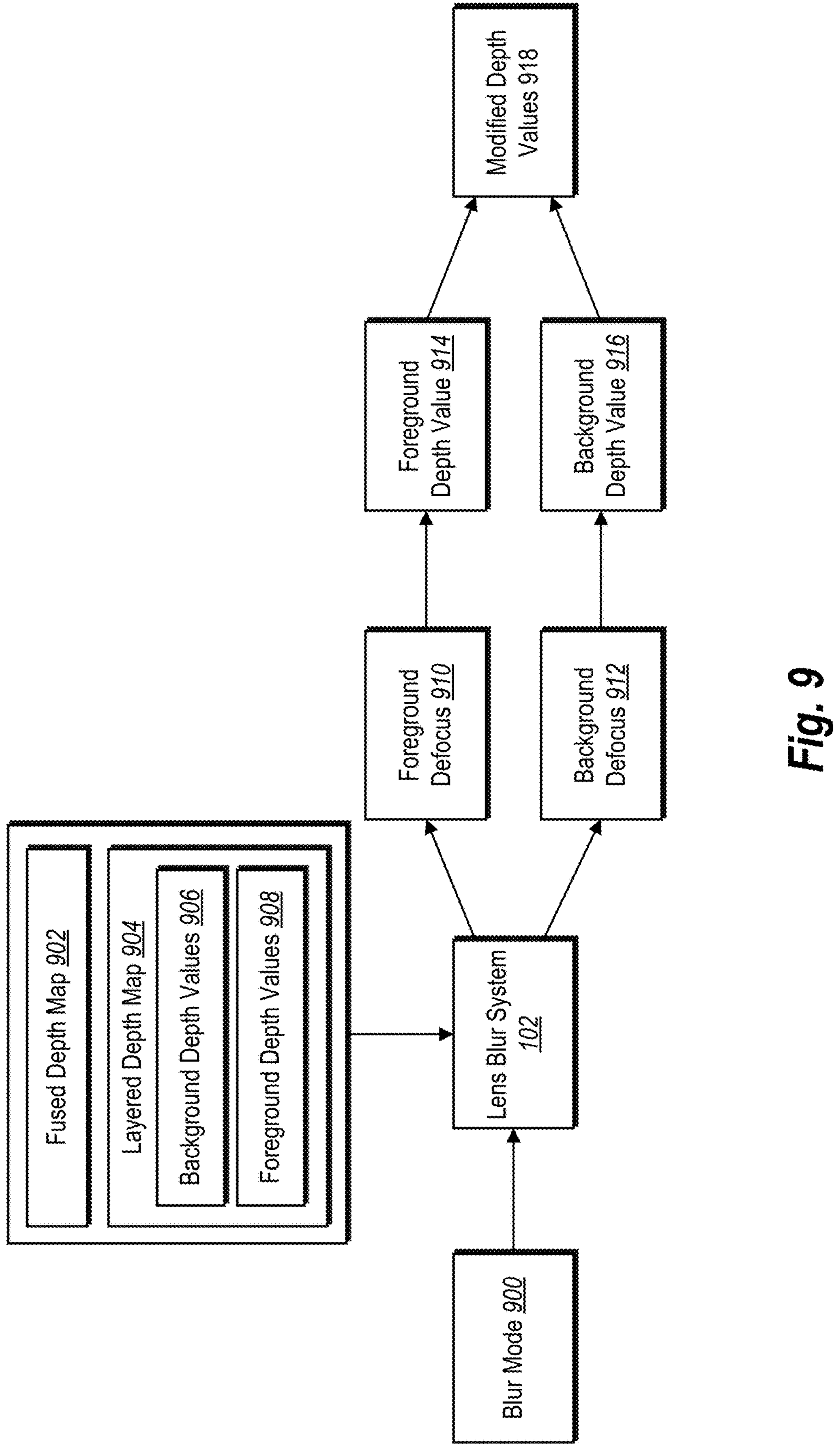
FIG. 9 illustrates a diagram of a process for modifying depth values of a digital image via a blur mode in accordance with one or more implementations.

Furthermore, in one or more embodiments, the lens blur system 102 generates modified depth values 606 for the selected portions 602 according to the selected correction mode 604. Specifically, the lens blur system 102 generates the modified depth values 606 for the selected portions 602 to be closer to an in-focus range of depths in connection with a focus mode. Alternatively, the lens blur system 102 generates the modified depth values 606 for the selected portions 602 to be farther from the in-focus range of depths in connection with a blur mode. FIGS. 8-9 and the corresponding description provide additional details associated with generating the modified depth values 606.

Figure 10:
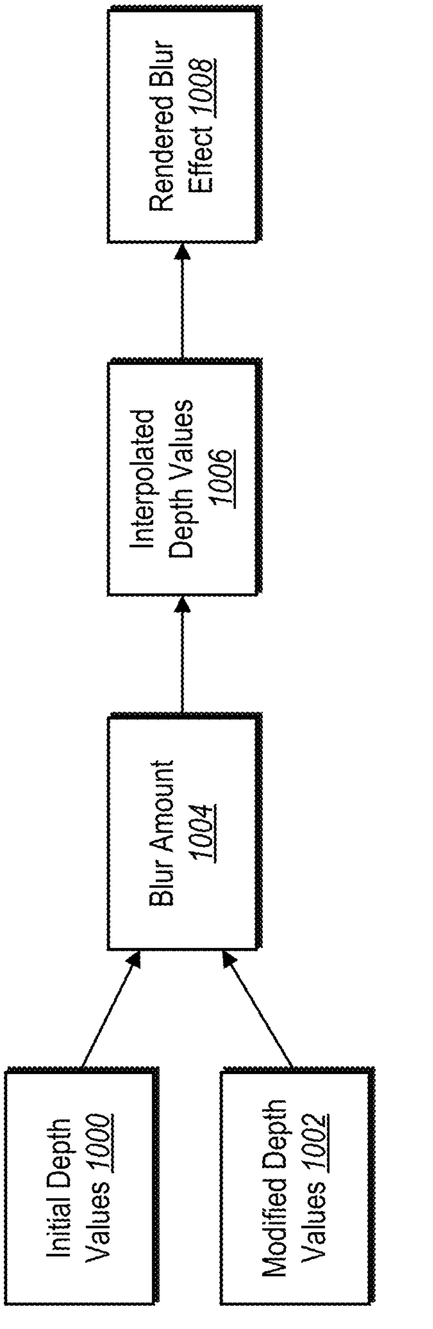
FIG. 10 illustrates a diagram of a process for interpolating depth values for rendering a digital image according to a selected blur amount in accordance with one or more implementations.

In some embodiments, the lens blur system 102 generates a corrected lens blur effect 608 utilizing the modified depth values 606. For example, the lens blur system 102 utilizes the modified depth values 606 to render the corrected lens blur effect 608 in the digital image, such as by rendering based on initial/original depth values of the pixels in the selected portions 602 and the modified depth values 606 for each correction. Furthermore, in some embodiments, the lens blur system 102 utilizes a selected blur amount to determine how to render the corrected lens blur effect 608. Accordingly, the lens blur system 102 provides a corrected lens blur effect 608 for one or more indicated portions of the digital image 600. FIG. 10 and the corresponding description provide additional detail associated with rendering a corrected lens blur effect for a digital image.

Figure 7:
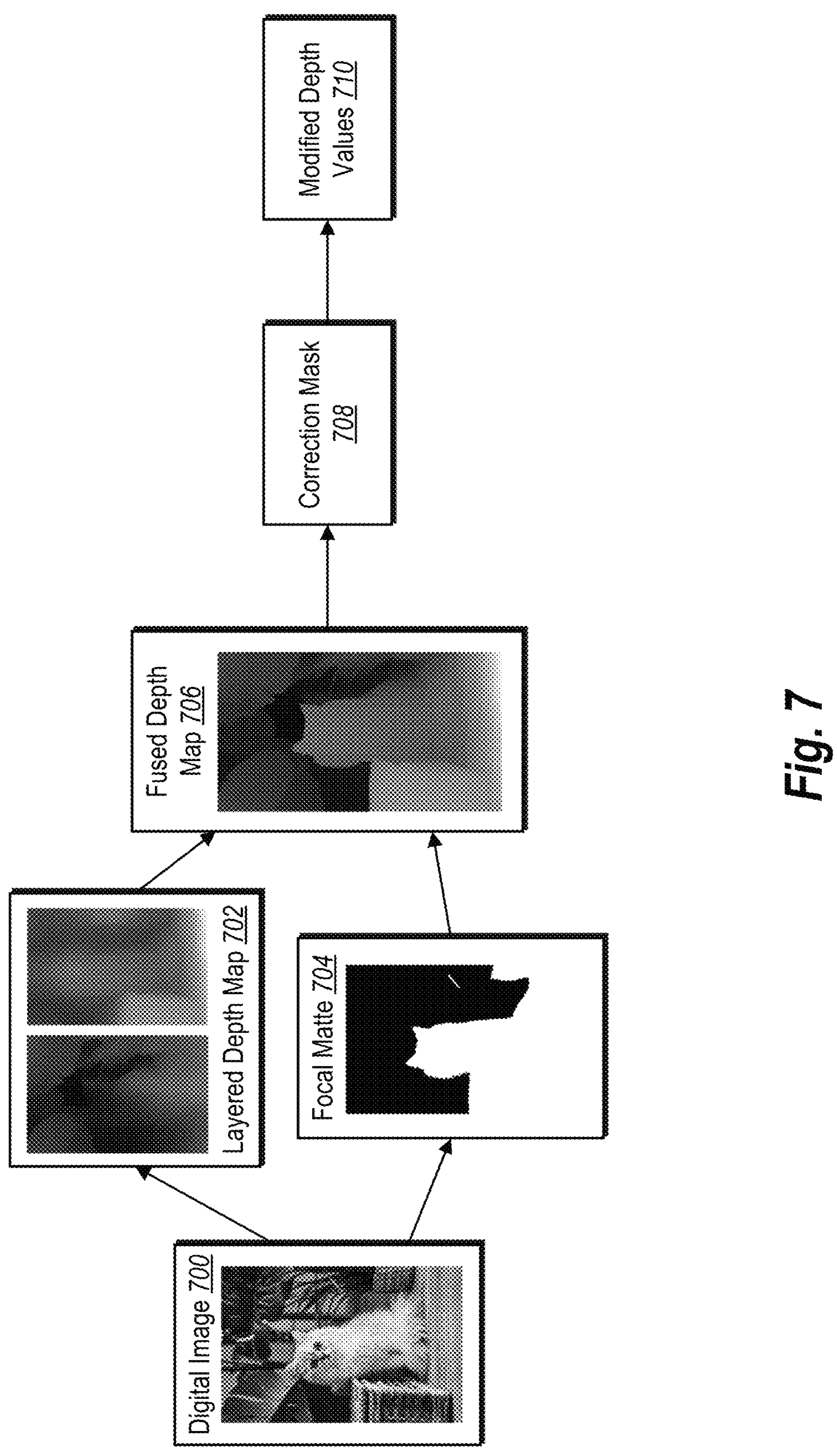
FIG. 7 illustrates a diagram of a process for modifying depth values of a digital image in response to a user interaction in accordance with one or more implementations.

As mentioned, FIG. 7 illustrates a process in which the lens blur system 102 generates modified depth values for a correction to a lens blur effect. In particular, the lens blur system 102 determines a digital image 700 in connection with a request to apply the lens blur effect to the digital image 700. Additionally, as previously described, the lens blur system 102 determines a layered depth map 702 and a focal matte 704 for the digital image 700 according to an initial estimated depth map and an indicated focus region of the digital image. Furthermore, as previously described, the lens blur system 102 generates a fused depth map 706 by combining foreground/background depth values utilizing the focal matte 704.

In one or more embodiments, the lens blur system 102 determines a correction mask 708 corresponding to one or more indicated portions of the digital image 700. For instance, the lens blur system 102 determines one or more portions of the depth values to correct for the digital image 700 in response to interactions via a focus blur modification tool indicating the one or more portions. To illustrate, the lens blur system 102 detects selected portions of the digital image 700 and identifies corresponding portions of the layered depth map 702 and fused depth map 706 in response to the interactions via the focus blur modification tool. Additionally, in some embodiments, the lens blur system 102 includes alpha values in the correction mask 708 according to a correction amount value to scale a blur/unblur effect for one or more portion(s).

In one or more embodiments, as described in more detail below, the lens blur system 102 detects interactions via parametric brush dabs or strokes. In alternative embodiments, the lens blur system 102 detects interactions via a selection (e.g., lasso) tool, a pen input, or other method of selecting portions of a digital image. The lens blur system 102 generates the correction mask 708 by assigning values (e.g., binary values or alpha values) to selected regions or non-selected regions according to the parameters (e.g., brushstroke parameters) of the focus blur modification tool.

In one or more embodiments, the lens blur system 102 generates modified depth values 710 for the selected portions of the digital image 700 according to the correction mask 708. For instance, the lens blur system 102 modifies the depth values of the layered depth map 702 and/or the fused depth map 706 according to the correction mask 708 and the correction mode. To illustrate, as mentioned previously, the lens blur system 102 modifies the depth values of the layered depth map 702 and the fused depth map 706 to blur or unblur portions of the digital image 700 according to the correction mode and the selected focus range. In some embodiments, the lens blur system 102 also modifies the focal matte 704 in connection with modifying the depth values according to the correction mode and/or other parameters for correcting the lens blur effect.

FIG. 8 illustrates an example of a process in which the lens blur system 102 modifies depth values for a correction mode to focus (e.g., unblur) one or more selected portions of a digital image. For example, as illustrated, the lens blur system 102 determines that a correction mode includes a focus mode 800 to unblur one or more blurred portions in a non-destructive blur process. Specifically, the focus mode indicates to the lens blur system 102 to bring one or more selected portions into focus relative to a focus range. Accordingly, the lens blur system 102 obtains depth values for the digital image including a fused depth map 802 and a layered depth map 804, which includes background depth values 806 and foreground depth values 808.

Furthermore, in one or more embodiments, the lens blur system 102 computes new depth values for pixels in the selected portion(s) by determining an in-focus range of depth values corresponding to the focus range. For instance, the lens blur system 102 determines depth values from a minimum depth value to a maximum depth value corresponding to the focus region relative to a camera viewpoint of the digital image. To illustrate, the lens blur system 102 determines the in-focus range of depth values based on a selected range via a tool in a graphical user interface displaying the digital image. Alternatively, the lens blur system 102 determines the in-focus range of depth values based on a default set of depth values (e.g., a set of depth values nearest a camera viewpoint of the digital image).

Additionally, for a given pixel in a selected portion of the digital image, the lens blur system 102 determines an in-focus depth value 810 nearest to the depth value of the pixel. To illustrate, in response to determining that a particular pixel has a higher depth value than the in-focus range of depth values (e.g., the pixel is indicated as being in the background), the lens blur system 102 selects the in-focus depth value 810 as the deepest depth value from the in-focus range of depth values. Alternatively, in response to determining that a pixel has a lower depth value than the in-focus range of depth values (e.g., the pixel is indicated as being in the foreground), the lens blur system 102 selects the in-focus depth value 810 as the shallowest depth value from the in-focus range of depth values.

Furthermore, as illustrated in FIG. 8, the lens blur system 102 generates modified depth values 812 according to in-focus depth values for the pixels in the depth map(s). In particular, the lens blur system 102 modifies depth values in the fused depth map 802 and the layered depth map 804 for pixels in the selected portion(s). For example, the lens blur system 102 generates a plurality of modified depth values for the particular pixel in the selected portion by setting a background depth value, a foreground depth value, and a fused depth value for the pixel to the in-focus depth value 810 to move the pixel into the in-focus range of depth values. Additionally, in one or more embodiments, the lens blur system 102 also generates a modified focal matte value 814 in response to determining that the focal matte has a focal matte value greater than zero for the pixel. To illustrate, the lens blur system 102 generates the modified focal matte value 814 by setting the focal matte value to 1 at the pixel location (e.g., indicating that the pixel is in the focus region).

FIG. 9 illustrates an example of a process in which the lens blur system 102 modifies depth values for a correction mode to blur one or more selected portions of a digital image. For example, as illustrated, the lens blur system 102 determines that a correction mode includes a blur mode 900. Specifically, the blur mode indicates to the lens blur system 102 to move one or more selected portions out of focus relative to a focus range. Accordingly, the lens blur system 102 obtains depth values for the digital image including a fused depth map 902 and a layered depth map 904, which includes background depth values 906 and foreground depth values 908.

In one or more embodiments, in response to determining that the blur mode 900 is the selected correction mode, the lens blur system 102 determines whether defocusing a selected portion involves moving it closer to the foreground or closer to the background. In particular, if the focus region for a blur effect is in the background, indicating a foreground defocus 910, blurring a selected portion involves moving the depth values of the selected portion closer to the foreground (e.g., by setting depth values to a foreground depth value). Alternatively, if the focus region for a blur effect is in the foreground, indicating a background defocus 912, blurring a selected portion involves moving the depth values of the selected portion closer to the background (e.g., by setting depth values to a background depth value). Furthermore, if the focus region for a blur effect is somewhere between the foreground and the background, blurring a selected portion can involve moving the depth values closer to the background or the foreground, depending on the current depth values of the selected portion.

To determine where to move a particular pixel toward a foreground or background, the lens blur system 102 compares a fused depth value from the fused depth map 902 for the pixel to the in-focus range of depth values. In one or more embodiments, the lens blur system 102 compares the fused depth value to a minimum value, a maximum value, a median value, and/or an average value of the in-focus range of depth values. The lens blur system 102 thus determines how to modify depth values for a given pixel based on its depth relative to the focus region.

In some embodiments, in response to determining that the blur mode 900 indicates a foreground defocus 910, the lens blur system 102 determines a foreground depth value 914 for modifying the depth values of the depth maps. For instance, the lens blur system 102 selects a depth value that is equal to a depth value from the foreground depth values 908 of the layered depth map 904 and at least halfway between the closest value in the in-focus range of depth values and an absolute foreground depth value (e.g., 0). Additionally, in some embodiments, in response to determining that a foreground depth value for the pixel from the layered depth map 904 is not at least halfway between the closest value in the in-focus range of depth values and the absolute foreground depth value, the lens blur system 102 selects the depth value that is halfway instead.

Furthermore, in some embodiments, in response to determining that the blur mode 900 indicates a background defocus 912, the lens blur system 102 determines a background depth value 916 for modifying the depth values of the depth maps. For example, the lens blur system 102 selects a depth value that is equal to a depth value from the background depth values 906 of the layered depth map 904 and at least halfway between the closest value in the in-focus range of depth values and an absolute background depth value (e.g., 1). In some embodiments, in response to determining that a background depth value for the pixel from the layered depth map 904 is not at least halfway between the closest value in the in-focus range of depth values and the absolute background depth value, the lens blur system 102 sets the background depth value 916 as the halfway point.

In one or more embodiments, in response to determining the specific type of defocus operation (e.g., foreground or background) for a pixel in a selected region, the lens blur system 102 generates modified depth values. For example, the lens blur system 102 generates a modified depth value of a pixel by increasing or decreasing a depth value based on a comparison of the fused depth value to the in-focus range of depth values. Specifically, the lens blur system 102 modifies the fused depth value and the depth values from the layered depth map 904 (e.g., a background depth value and a foreground depth value) corresponding to the pixel to the corresponding selected depth value. To illustrate, the lens blur system 102 sets the depth values corresponding to the pixel to the foreground depth value 914 for a foreground defocus 910 or to the background depth value 916 for a background defocus 912. Furthermore, in some embodiments, the lens blur system 102 does not change the focal matte value corresponding to the pixel. The lens blur system 102 thus generates modified depth values 918 for each of the pixels in the selected portion(s).

In response to determining modified depth values for pixels in one or more selected portions of a digital image, the lens blur system 102 utilizes the modified depth values to correct a lens blur effect. FIG. 10 illustrates a process in which the lens blur system 102 utilizes modified depth values for one or more portions of a digital image to determine how to render corrections to a lens blur effect. Specifically, the lens blur system 102 utilizes the modified depth values in connection with other parameters to render the corrected blur effects in the digital image.

As illustrated in FIG. 10, the lens blur system 102 determines initial depth values 1000 corresponding to the pixels in the selected portions. In particular, the initial depth values 1000 include depth values that the lens blur system 102 utilizes to generate an initial lens blur effect for the digital image. For example, the lens blur system 102 determines initial background depth values and initial foreground depth values from a layered depth map. Additionally, the lens blur system 102 determines initial fused depth values from a fused depth map.

In one or more embodiments, the lens blur system 102 also determines a blur amount 1004 in connection with a particular correction. Specifically, the lens blur system 102 determines the blur amount 1004 as an amount of correction to apply to a blur effect in the selected portions. For example, the lens blur system 102 determines the blur amount 1004 in response to an amount indicated via a user interface tool. To illustrate, the lens blur system 102 can detect an interaction with the user interface tool (e.g., a slider or amount field) indicating the blur amount 1004 in connection with determining the selected portions.

As illustrated in FIG. 10, the lens blur system 102 utilizes the blur amount 1004 to determine interpolated depth values 1006 for a correction to the lens blur effect. In particular, the lens blur system 102 determines whether the blur amount 1004 is in a first range (e.g., between 0 and 1). If the blur amount 1004 is in the first range, the lens blur system 102 utilizes the blur amount 1004 to generate the interpolated depth values 1006 by linearly interpolating between the initial depth values 1000 and the modified depth values 1002 for the corresponding fused depth values, foreground depth values, background depth values, and focal matte values.

Furthermore, the lens blur system 102 determining whether the blur amount 1004 is in a second range (e.g., between 1 and 2), which is applicable to corrections in a blur mode. In response to the blur amount 1004 being in the second range, the lens blur system 102 generates the interpolated depth values 1006 by linearly interpolating between the modified depth values 1002 and an absolute foreground depth value (e.g., 0) or an absolute background depth value (e.g., 1). More specifically, the lens blur system 102 linearly interpolates the modified depth values in response to determining whether the blur mode results in a foreground defocus or a background defocus, as described previously.

As illustrated in FIG. 10, the lens blur system 102 utilizes the interpolated depth values 1006 to generate a rendered blur effect 1008 with applicable corrections. In one or more embodiments, the lens blur system 102 determines, for each correction (e.g., in a series of separate corrections), interpolated fused depth values, foreground depth values, background depth values, and focal matte values. Accordingly, in response to updating a layered depth map and a focal matte for a first correction as indicated above, the lens blur system 102 updates the layered depth map and the focal matte for a second correction in a similar manner. The lens blur system 102 thus builds the corrected lens blur effect for the second correction on top of the corrected lens blur effect for the first correction. In response to processing all corrections, the lens blur system 102 utilizes the modified layered depth map to generated the rendered blur effect 1008.

Figure 11:
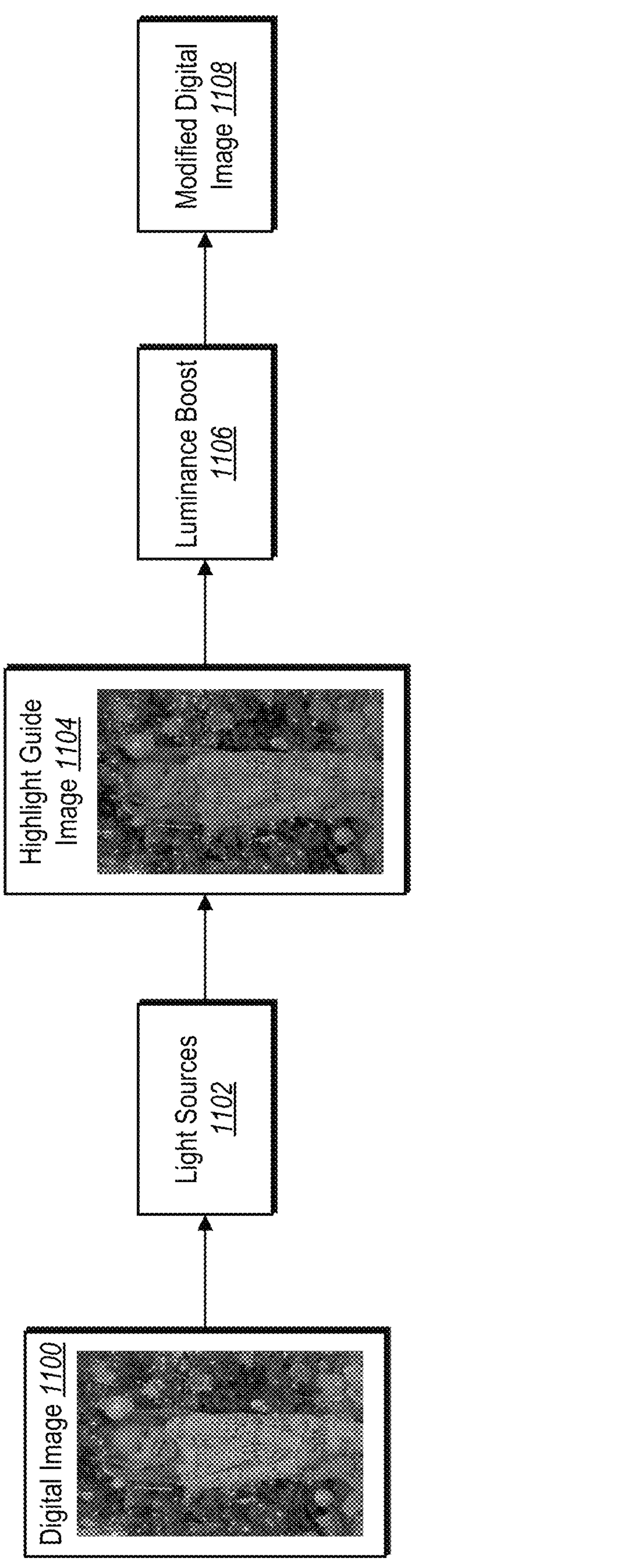
FIG. 11 illustrates a diagram of a process for boosting luminance of light sources in a digital image in accordance with one or more implementations.

As mentioned, in one or more embodiments, the lens blur system 102 applies lens blur effects in digital images with realistic blurring of light sources detected in the digital images. FIG. 11 provides an overview of a process for boosting luminance of light sources of a digital image via a highlight guide image. In particular, FIG. 11 illustrates that the lens blur system 102 generates the highlight guide image in connection with detected light sources of a digital image for storage with the digital image and to use in connection with modifying the digital image.

As illustrated in FIG. 11, the lens blur system 102 determines a digital image 1100 in connection with a request to apply a lens blur effect to the digital image 1100. For example, the lens blur system 102 determines that the request involves applying a lens blur effect to the digital image, as described above. In one or more embodiments, the lens blur system 102 detects light sources 1102 in the digital image 1100. Specifically, the lens blur system 102 detects portions of the digital image corresponding to light sources that are visible within the digital image, including point light sources, global light sources (e.g., sunlight), or other sources of light that appear within the digital image 1100.

Figure 12:
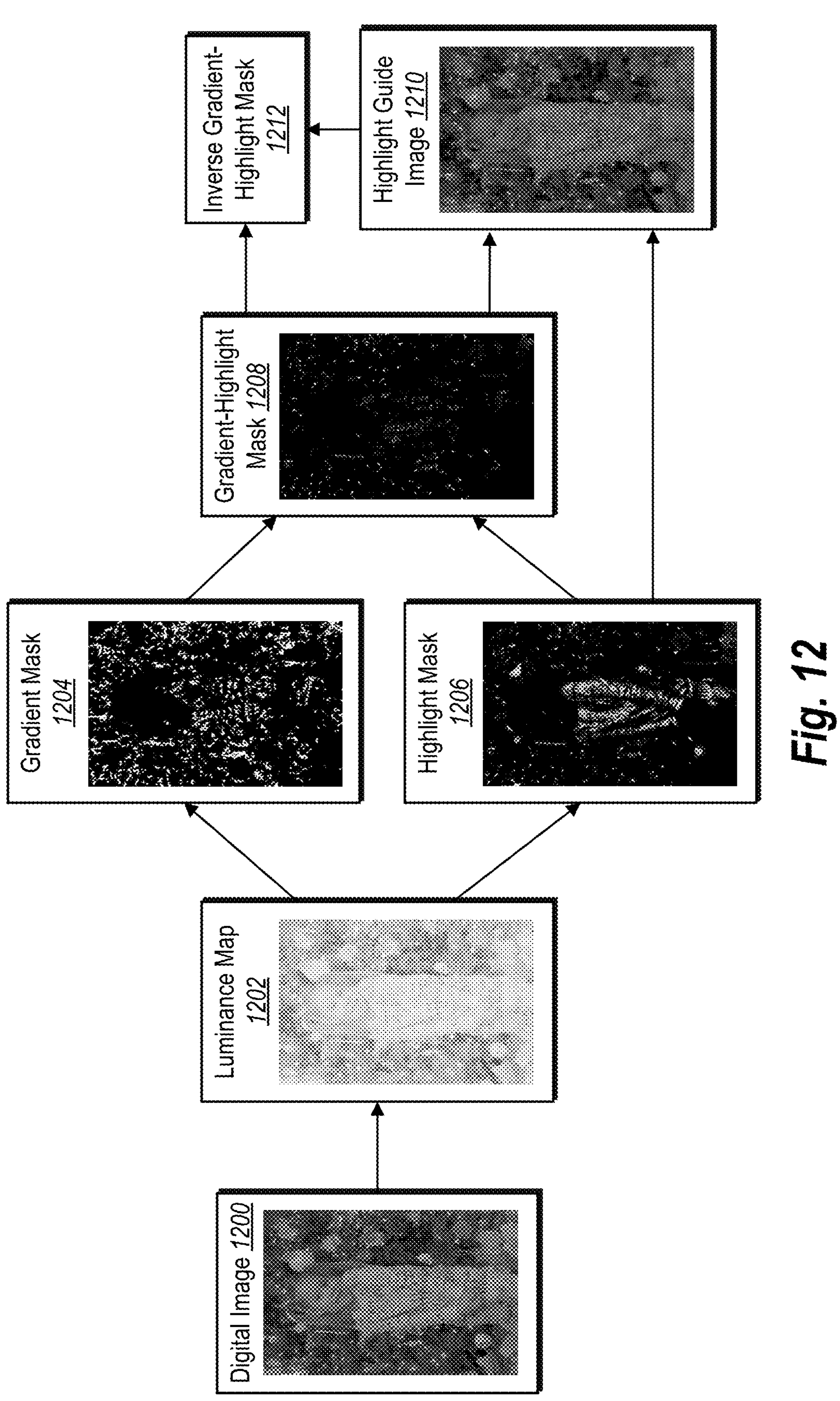
FIG. 12 illustrates a diagram of a process for generating a highlight guide image for a digital image in accordance with one or more implementations.
Figure 13:
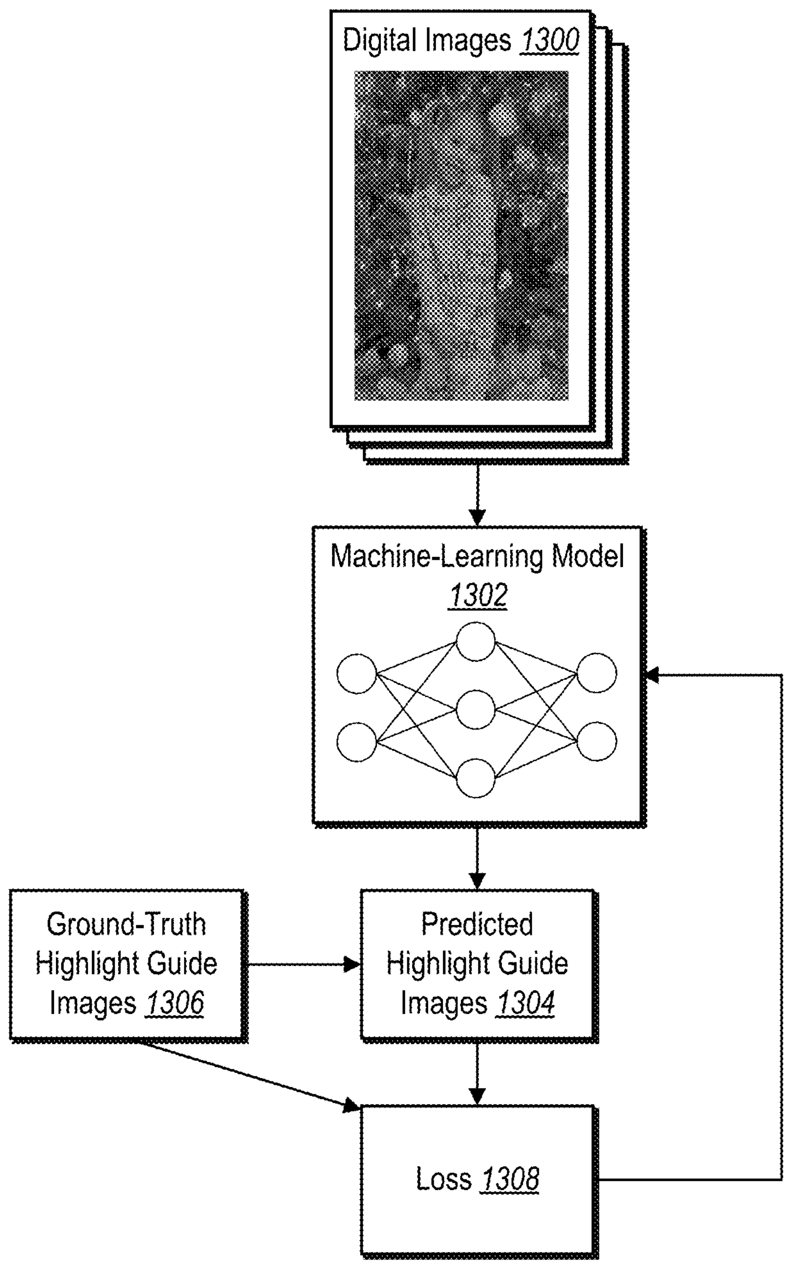
FIG. 13 illustrates a diagram of a process for learning parameters of a machine-learning model for generating highlight guide images in accordance with one or more implementations.

In one or more embodiments, the lens blur system 102 generates a highlight guide image 1104 based on the light sources 1102 of the digital image 1100. In particular, the highlight guide image 1104 includes a visual representation of the light sources 1102 detected in the digital image 1100. For example, the highlight guide image 1104 includes a mask that highlights pixels of the digital image 1100 corresponding to the light sources 1102 for use in modifying blurring effects applied to the digital image 1100. By generating and storing the highlight guide image 1104 with the digital image 1100, the lens blur system 102 provides realistic blurring effects to the light sources 1102 by applying additional modifications to the portions of the digital image 1100 corresponding to the light sources 1102. FIGS. 12-13 and the corresponding description provide additional details associated with generating an highlight guide image for a digital image via various highlight guide image generation processes.

For example, as illustrated in FIG. 11, the lens blur system 102 determines a luminance boost 1106 for the light sources 1102 according to the highlight guide image 1104. In one or more embodiments, the lens blur system 102 utilizes the highlight guide image 1104 to determine the specific pixels in the digital image 1100 for boosting luminance values. As described in more detail below with respect to FIG. 14, the lens blur system 102 determines the luminance boost 1106 according to the highlight guide image 1104 and various blur parameters. Furthermore, as illustrated, the lens blur system 102 generates a modified digital image 1108 by boosting luminance values of portions of the digital image 1100 corresponding to the light sources 1102 in connection with a lens blur effect.

As mentioned, in one or more embodiments, the lens blur system 102 generates a highlight guide image for a digital image utilizing one or more different processes. FIG. 12 illustrates an example in which the lens blur system 102 generates a highlight guide image for a digital image based on luminance values extracted from the digital image. In particular, the lens blur system 102 generates a plurality of masks based on the extracted luminance values of the digital image 1200 and generates the highlight guide image based on the plurality of masks.

In one or more embodiments, the lens blur system 102 determines a luminance map 1202 of the digital image 1200. Specifically, the lens blur system generates the luminance map 1202 by extracting luminance values of pixels in the digital image 1200. For example, the lens blur system 102 downsamples the digital image 1200 and determines the luminance values of the pixels from the donwsampled digital image. To illustrate, downsampling the digital image 1200 provides a reduced size for generating an highlight guide image for the digital image 1200. Additionally, donwsampling the digital image 1200 provides consistent light source boosting when rendering lens blur effects at resolutions that are different from the digital image 1200. In alternative embodiments, the lens blur system 102 determines the luminance map 1202 at an original resolution of the digital image 1200.

In one or more embodiments, the lens blur system utilizes the luminance map 1202 to generate a plurality of masks. For example, as illustrated in FIG. 12, the lens blur system 102 utilizes the luminance map 1202 to generate a gradient mask 1204 of the digital image 1200. To illustrate, the lens blur system 102 determines the gradient mask 1204 by applying a gradient filter (or gradient detection filter) to the luminance map 1202. In one or more embodiments, the lens blur system 102 applies a Laplacian filter (or other gradient filter such as a Sobel filter) to the luminance map 1202 to identify high-contrast edges in the luminance map 1202, which indicates boundaries possibly belonging to light sources (e.g., point-like light sources) in the digital image 1200. The lens blur system 102 also generates the gradient mask 1204 by selecting a subset of gradients that meet a threshold gradient value. Additionally, in one or more embodiments, the lens blur system 102 generates the gradient mask 1204 (or a modified gradient mask) by dilating the output of the gradient filter to compensate for certain point-like structures detected in the luminance map 1202 becoming ring-shaped given that the gradient magnitude is sometimes highest along their boundaries.

In at least some embodiments, the lens blur system 102 also determines a highlight mask 1206 based on the luminance map 1202 of the digital image 1200. In particular, the lens blur system 102 generates the highlight mask 1206 to mask pixels from the luminance map 1202 that most likely correspond to light sources. For example, the lens blur system 102 determines such pixels by comparing the luminance values of the pixels in the luminance map 1202 to a threshold luminance, thus retaining only luminance values that meet the threshold luminance. By thresholding the luminance values, the lens blur system 102 eliminates values corresponding to certain non-light source image components. Furthermore, in some embodiments, the lens blur system 102 applies a tone curve (e.g., a tone curve filter) to the thresholded values to further emphasize the brightest values in the highlight mask 1206.

In one or more embodiments, the lens blur system 102 generates a combined mask based on the gradient mask 1204 and the highlight mask 1206. Specifically, the lens blur system 102 generates a gradient-highlight mask 1208 that combines details in the gradient mask 1204 with details in the highlight mask 1206. For instance, the lens blur system 102 generates the gradient-highlight mask 1208 by selecting only pixels that are in both the gradient mask 1204 and the highlight mask 1206. By selecting pixels that are in both the gradient mask 1204 and the highlight mask 1206 to generate the gradient-highlight mask 1208, the lens blur system 102 removes small high-contrast objects that are not also light sources, such as dust spots with high contrast to the background (e.g., dust spots produced by dust on sensors) or other similar visual elements.

Furthermore, the lens blur system 102 utilizes the gradient-highlight mask 1208 to generate a highlight guide image 1210 of the digital image 1200. In particular, the lens blur system 102 generates the highlight guide image 1210 to indicate light sources in the digital image 1200 for use in boosting luminance values of the pixels corresponding to the light sources during blurring operations. For example, the lens blur system 102 generates the highlight guide image 1210 based on a combination of the gradient-highlight mask 1208 with one or more additional masks. To illustrate, the lens blur system 102 generates an inverse gradient-highlight mask 1212 by inverting the gradient-highlight mask 1208, which provides shadow scaling for light sources. Furthermore, the lens blur system 102 generates the highlight guide image 1210 by combining the gradient-highlight mask, the inverse gradient-highlight mask 1212, and the highlight mask 1206 (e.g., to scale highlights not in the gradient mask 1204).

In one or more embodiments, the lens blur system generates the highlight guide image 1210 as a weighted sum of the gradient-highlight mask 1208, the inverse gradient highlight mask 1212, and the highlight mask 1206. For instance, the lens blur system 102 generates the highlight guide image 1210 based on a weighted sum for boosting certain light sources more than others at render time. To illustrate, the lens blur system 102 utilizes the weighted sum in the highlight guide image 1210 to boost light sources that are softer while boosting well-defined point light sources more than the soft light sources during rendering.

In at least some embodiments, the lens blur system 102 generates the highlight guide image 1210 as a separate image. For example, the lens blur system 102 generates the highlight guide image 1210 to store as a separate image file from the digital image 1200. The lens blur system 102 also generate a mapping between the highlight guide image 1210 to the digital image 1200. Alternatively, the lens blur system 102 generates the highlight guide image 1210 as metadata attached to the digital image 1200. In either case, the lens blur system 102 provides the highlight guide image 1210 for access with the digital image 1200 in connection with editing the digital image 1200 via one or more digital image applications and/or one or more versions of the digital image 1200 (e.g., different resolutions or edited versions of the digital image 1200).

To illustrate, in response to a request to open the digital image 1200 within a digital image application, the lens blur system 102 accesses the highlight guide image 1210 mapped to the digital image for editing the digital image 1200. The lens blur system 102 also accesses the highlight guide image 1210 for an additional version of the digital image 1200 in the digital image application or another digital image application. Accordingly, in some embodiments, the lens blur system 102 renders a plurality of versions of the digital image 1200 with various lens blur effects according to the highlight guide image 1210.

In addition to utilizing a plurality of masks to generate a highlight guide image for a digital image from a luminance map, in additional embodiments, the lens blur system 102 generates the highlight guide image (or one or more of the masks) utilizing a machine-learning model. For example, FIG. 13 illustrates an embodiment in which the lens blur system 102 utilizes a machine-learning model to generate highlight guide images for digital images. Additionally, FIG. 13 illustrates that the lens blur system 102 trains the machine-learning model (e.g., by learning parameters of the machine-learning model) according to ground-truth highlight guide data for digital images.

In one or more embodiments, the lens blur system 102 determines a dataset of digital images 1300 for use in training a machine-learning model 1302. For example, the dataset includes a set of training digital images. In additional embodiments, the dataset includes a set of testing digital images and/or a set of validation digital images for testing and/or validating the machine-learning model.

In at least some embodiments, the machine-learning model 1302 includes a computer representation that is tuned (e.g., trained) based on inputs to approximate unknown functions. For instance, a machine-learning model includes a neural network with one or more layers or artificial neurons that approximate unknown functions by analyzing known data at different levels of abstraction. In some embodiments, the machine-learning model 1302 includes one or more neural network layers including, but not limited to, a convolutional neural network, a recurrent neural network, a transformer-based neural network, or a feedforward neural network. In one or more embodiments, the machine-learning model 1302 includes, but is not limited to, a plurality of separate neural network branches such as a neural network encoder to encode image features relevant to an highlight guide image and a neural network decoder to decode encoded image features relevant to the highlight guide image. In one or more embodiments, the machine-learning model 1302 includes one or more neural network layers to hallucinate (e.g., fill) details in a luminance map by generating original scene-referred luminance values of one or more light sources before clipping by a limited capacity of a camera sensor that captures a digital image. Furthermore, in some embodiments, the lens blur system 102 utilizes machine-learning models to generate masks, mattes, or maps in connection with applying lens blur effects to digital images.

In one or more embodiments, the lens blur system 102 utilizes the machine-learning model 1302 to generate predicted highlight guide images 1304 for the digital images 1300. For example, the lens blur system 102 utilizes the machine-learning model 1302 to process each digital image in the digital images 1300 and generate predicted highlight guide images 1304 for the corresponding digital images. Accordingly, the lens blur system 102 utilizes the machine-learning model 1302 to generate a plurality of highlight guide images for the digital images 1300 to provide visual representations of various light sources in the digital images 1300.

In some embodiments, the lens blur system 102 improves performance of the machine-learning model 1302 by comparing the predicted highlight guide images 1304 to ground-truth highlight guide images 1306. For example, the lens blur system 102 generates or determines the ground-truth highlight guide images 1306 via the process described above with respect to FIG. 12. Alternatively, the lens blur system 102 determines the ground-truth highlight guide images 1306 via human-labeled highlight guide images.

In one or more embodiments, the lens blur system 102 compares the predicted highlight guide images 1304 to the ground-truth highlight guide images 1306 to determine a loss 1308. For example, the lens blur system 102 determines the loss 1308 as a cross-entropy loss or an L2 loss between the predicted highlight guide images 1304 and the corresponding ground-truth highlight guide images 1306. The lens blur system 102 utilizes the loss 1308 to modify parameters of the machine-learning model 1302 based on differences between the predicted highlight guide images 1304 and the ground-truth highlight guide images 1306. To illustrate, the lens blur system 102 trains the machine-learning model 1302 via backpropagation of the loss 1308 through a neural network encoder and/or a neural network decoder of the machine-learning model 1302.

Figure 14:
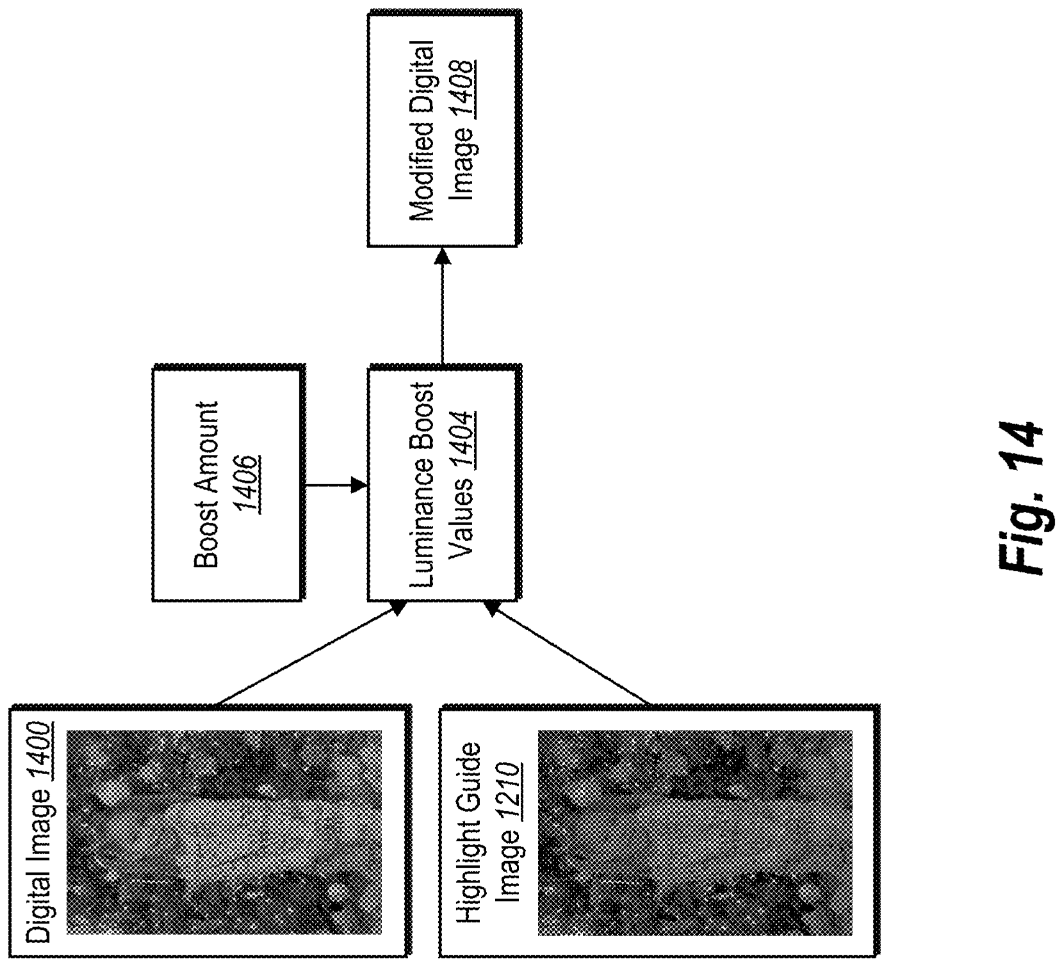
FIG. 14 illustrates a diagram of a process for modifying a lens blur effect in a digital image by boosting luminance values of light sources in accordance with one or more implementations.

In one or more embodiments, in response to generating a highlight guide image for a digital image (e.g., via the processes described above with respect to FIG. 12 or FIG. 13), the lens blur system 102 utilizes the highlight guide image to modify luminance values of one or more light sources in the digital image. In particular, as illustrated in FIG. 14, the lens blur system 102 determines, for a digital image 1400, a highlight guide image 1402 indicating one or more light sources. During rendering of a lens blur effect for the digital image 1400, the lens blur system 102 utilizes the highlight guide image 1402 to determine luminance boost values 1404 for the light source(s).

In one or more embodiments, the lens blur system 102 determines the luminance boost values 1404 by determining the contribution of a given pixel based on a luminance value of the pixel in the digital image 1400, a highlight value of the pixel in the highlight guide image 1402, and a blur value (e.g., a local blur radius) of the lens blur effect for the pixel. For instance, the lens blur system 102 extracts the highlight value of the pixel from the highlight guide image 1402, which indicates whether the pixel belongs to a light source in the digital image 1400. Additionally, the lens blur system 102 determines the luminance value of the pixel directly from the digital image 1400 or from a luminance map of the digital image 1400. The lens blur system 102 determines the local blur radius based on a lens blur effect and the corresponding blurring parameters for applying the lens blur effect to the digital image 1400 (e.g., a depth of the pixel relative to a focus range and blur strength).

In one or more embodiments, the lens blur system 102 also determines a boost amount 1406 for determining the luminance boost values 1404. For instance, the lens blur system 102 determines the boost amount 1406 in response to a selection of the boost amount 1406 via a boost setting within a graphical user interface (e.g., according to a user input). To illustrate, the boost amount 1406 indicates a luminance threshold corresponding to highlight values considered for boosting. More specifically, increasing the boost amount 1406 causes the lens blur system 102 to decrease the luminance threshold while increasing the amount by which the lens blur system 102 scales the luminance boost values 1404. Specifically, the lens blur system 102 selects highlight values according to a luminance threshold determined from the boost amount and determines a scaling amount based on the boost amount. Accordingly, decreasing the boost amount 1406 causes the lens blur system 102 to increase the luminance threshold while decreasing the amount by which the lens blur system 102 scales the luminance boost values 1404.

In one or more embodiments, the lens blur system 102 utilizes the local blur radius to apply realistic luminance boosting in a lens blur effect for light sources in a modified digital image 1408. Additionally, the dependence of the luminance boost values 1404 on the local blur radius increases the visibility of light sources that have their light scattered more by larger blur radii. Accordingly, increased or decreased blur radii, which change depending on the parameters of the lens blur effect and the depth of each pixel relative to an in-focus range of depth values, also impacts whether the lens blur system 102 increases or decreases luminance boost values of pixels corresponding to light sources at different depths.

Figure 15:
FIG. 15 illustrates a graphical user interface for modifying a digital image via one or more lens blur settings in accordance with one or more implementations.

FIGS. 15-23 illustrate a plurality of graphical user interfaces of client devices for performing various depth-based lens blur effects on a digital image. FIG. 15 illustrates a graphical user interface displaying a digital image 1500 and a plurality of blur parameters for applying a lens blur effect to the digital image 1500. In particular, as illustrated in FIG. 15, a client device displays the digital image 1500 within the graphical user interface for applying various edits to the digital image 1500. For example, the client device displays the digital image 1500 within a digital image application that provides lens blur tools 1502 to generate a synthetic lens blur effect that imitates a realistic lens blur effect generated when capturing a digital image according to various lens parameters and scene depth of field.

To illustrate, the client device provides the lens blur tools 1502 with a blur amount tool 1504 for indicating an amount of blur to apply in a lens blur effect to the digital image 1500. In one or more embodiments, the client device provides the lens blur system 102 with a blur amount based on an input via the blur amount tool 1504. The lens blur system 102 utilizes the blur amount in connection with blurring light sources, out-of-focus depth values, etc., to render the lens blur effect via a non-destructive processing pipeline. In some embodiments, the blur amount tool 1504 also includes other parameters, such as a bokeh parameter and/or a boost parameter.

Additionally, FIG. 15 illustrates that the lens blur tools 1502 include a focal range selection tool 1506. In particular, the lens blur system 102 provides the focal range selection tool 1506 to indicate an adjustable range of depth values in connection with generating the lens blur effect. For instance, the focal range selection tool 1506 includes a slider element (e.g., a sliding window 1508) and/or other range selection element (e.g., a set of input fields 1510) to indicate a minimum and a maximum depth value for an in-focus range of values relative to a depth map of the digital image 1500. To illustrate, moving the sliding window 1508 from left to right changes the focus region indicating the in-focus range of depth values from nearer to a camera viewpoint to farther from the camera viewpoint (e.g., from a foreground to a background).

Figure 16:
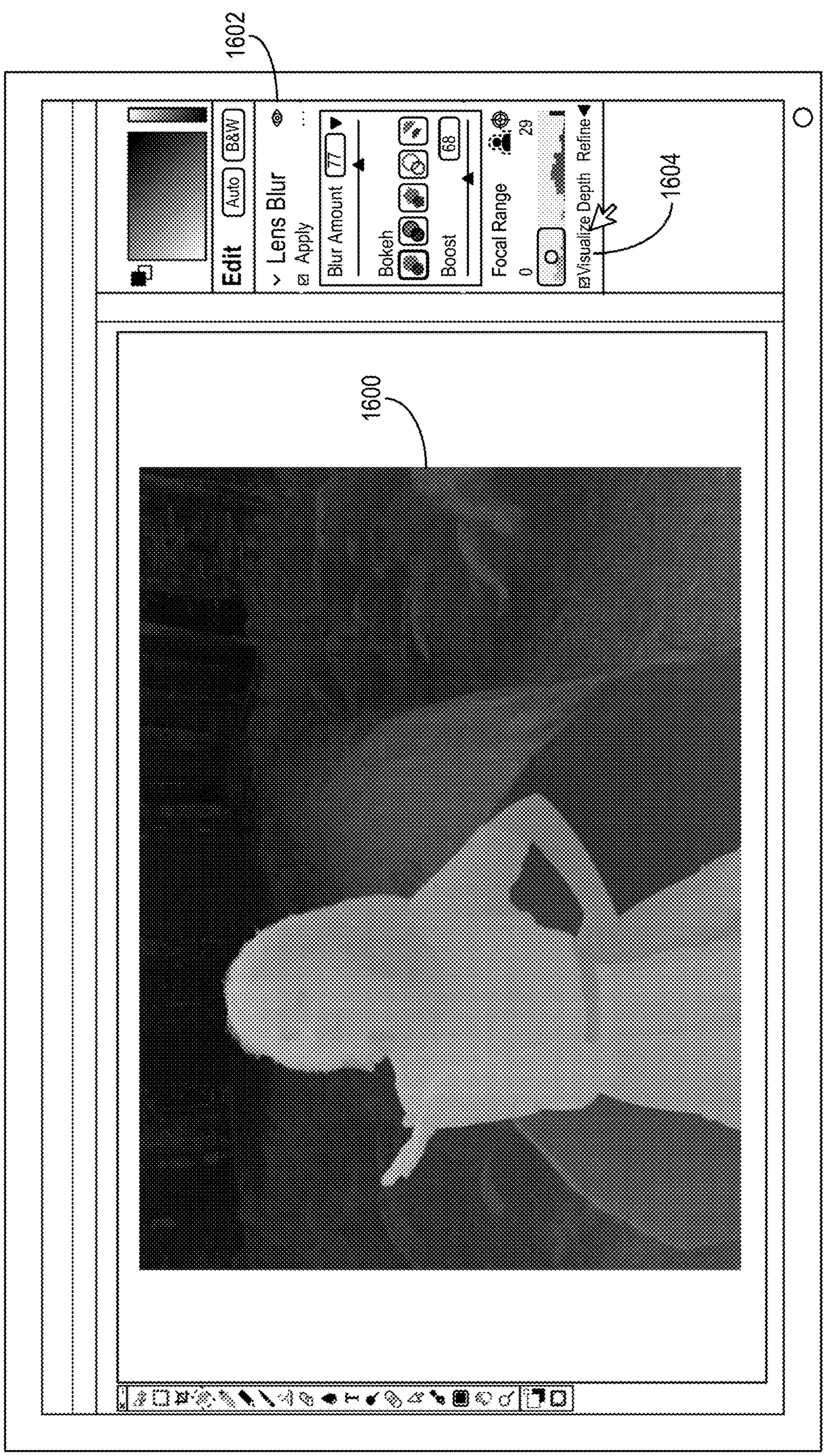
FIG. 16 illustrates a graphical user interface for displaying a depth map of a digital image in accordance with one or more implementations.

In one or more embodiments, the lens blur system 102 provides tools to visualize depth information for a digital image. For example, FIG. 16 illustrates a graphical user interface for displaying a depth map 1600 corresponding to a digital image (e.g., the digital image 1500 of FIG. 15). In particular, the client device displays lens blur tools 1602 including a depth visualization element 1604. In response to a selection of the depth visualization element 1604, the client device obtains and displays the depth map 1600 (or a visual representation of the depth map). In one or more embodiments, the client device displays the depth map 1600 based on an initial estimated depth map for the digital image or a fused depth generated from a layered depth map for the digital image.

To illustrate, the depth map 1600 displayed in the client device includes color values representing the depth values of pixels in the digital images. As an example, lighter values in the depth map 1600 correspond to pixels in the foreground (e.g., closer to the camera viewpoint) and darker values in the depth map 1600 correspond to pixels in the background (e.g., farther from the camera viewpoint). By visualizing the depth map 1600 within the graphical user interface, the lens blur system 102 can provide a user with the ability to quickly identify an estimation of depth values for portions of the digital image, including possible errors in the depth map 1600 for correction.

Figure 17:
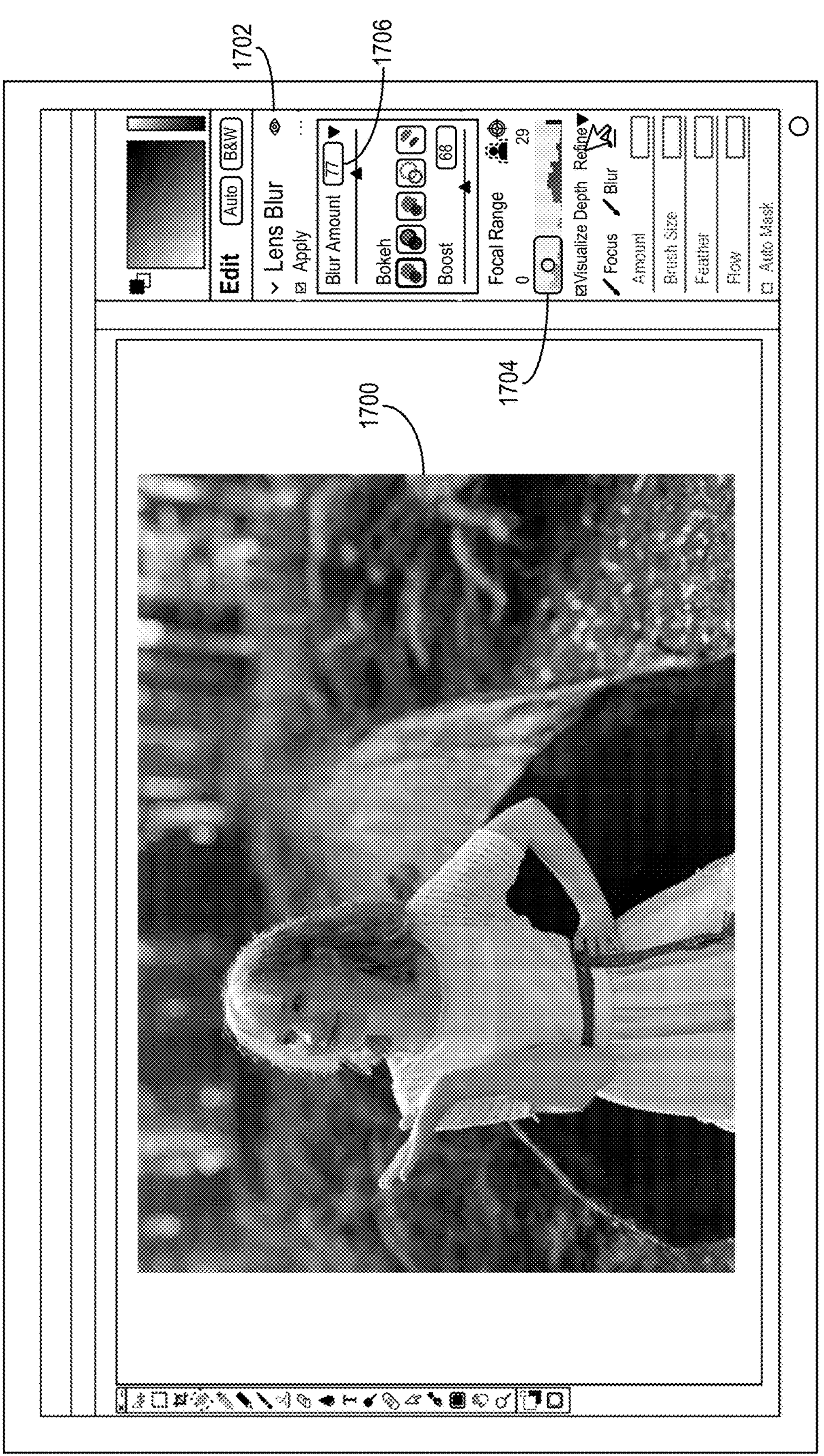
FIG. 17 illustrates a graphical user interface for applying a lens blur effect to a digital image in accordance with one or more implementations.

FIG. 17 illustrates a graphical user interface for displaying a modified digital image 1700 including a rendered lens blur effect. Specifically, as illustrated, the lens blur system 102 utilizes the blur parameters from lens blur tools 1702 to generate the modified digital image 1700 by rendering the lens blur effect on a digital image (e.g., the digital image 1500 of FIG. 15). For example, the lens blur system 102 determines a focus region (e.g., based on a selected focal range indicated by a position of a sliding window 1704) and a blur amount (e.g., indicated by a value input via a blur amount tool 1706). As shown, the lens blur system 102 determines that the focus region corresponds to a foreground focus and background defocus.

Accordingly, the lens blur system 102 generates the modified digital image 1700 to apply a lens blur effect that blurs background elements according to relative depth values of the pixels in the background and the blur amount. For example, the lens blur system 102 generates a plurality of masks for the digital image utilizing the corresponding depth map. To illustrate, the lens blur system 102 generates a focus mask based on the selected focus range and/or a default focus range (e.g., based on a subject mask corresponding to a detected foreground object), a focal matte based on the focus mask, a layered depth map that hallucinates foreground and background depth information across the entire digital image, and a fused depth map combining information from the layered depth map and the focal matte. The lens blur system 102 utilizes the various masks (e.g., the focal matte and the fused depth map) to render the modified digital image 1700 with the lens blur effect via a splatting operation.

Figure 18:
FIG. 18 illustrates a graphical user interface for selecting a focus region for a digital image in accordance with one or more implementations.

In one or more embodiments, modifying a focus region causes the lens blur system 102 to modify the lens blur effect on the digital image. For instance, FIG. 18 illustrates a graphical user interface for displaying a modified digital image 1800 with a different focus region than the modified digital image 1700 of FIG. 17. In particular, the lens blur system 102 determines that the focus region corresponds to a range of depth values in a background of the digital image. To illustrate, the lens blur system 102 determines that a sliding window 1802 indicates an in-focus range of values corresponding to higher depth values (e.g., depth values farther in the background). Thus, by providing a tool for modifying an in-focus range of depth values and other lens blur parameters, the lens blur system 102 provides customizable depth-based lens blur with real-time, non-destructive rendering of the lens blur effects.

Figure 19:
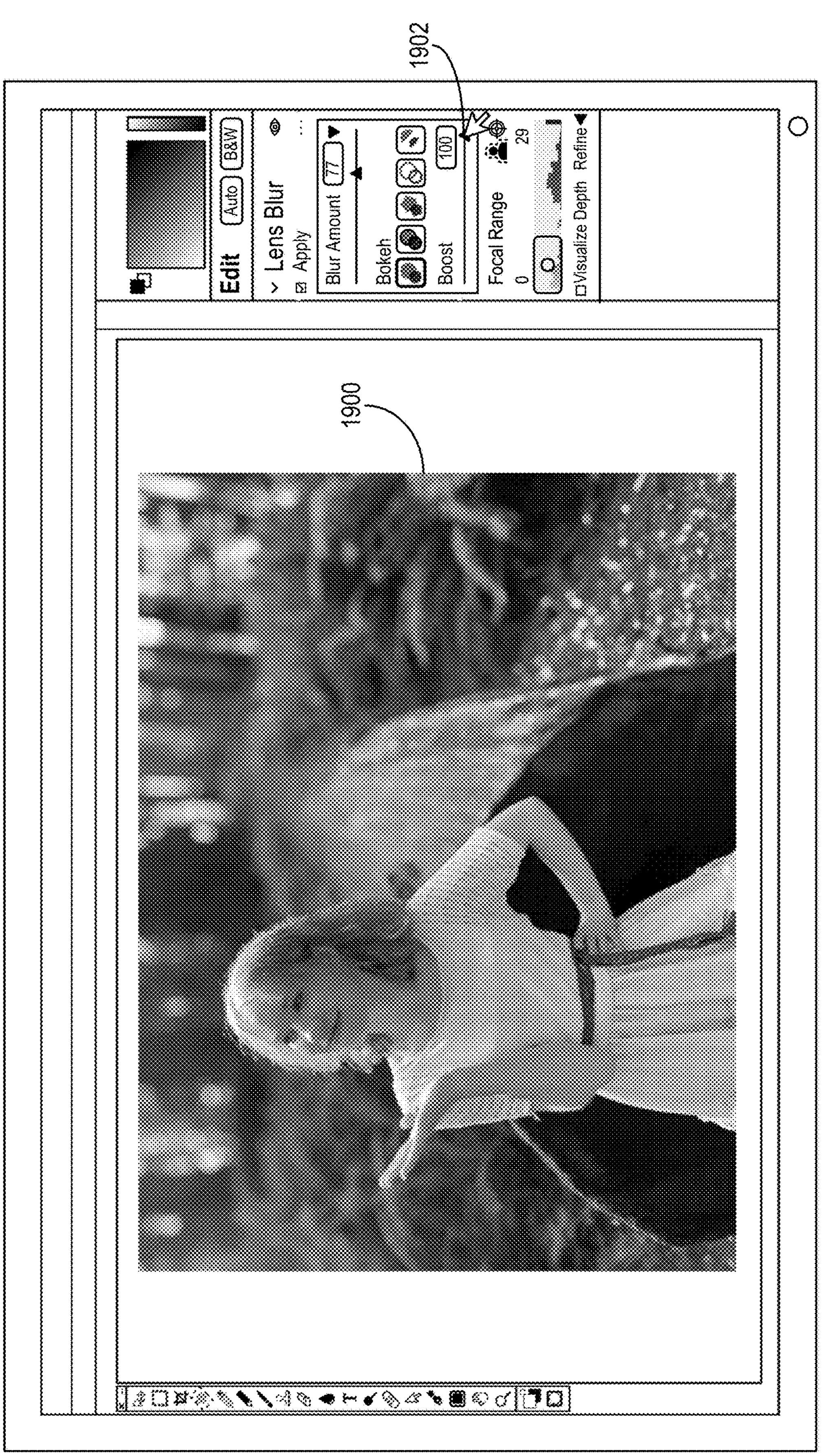
FIG. 19 illustrates a graphical user interface for modifying luminance boost values of light sources in a digital image in accordance with one or more implementations.

In additional embodiments, the lens blur system 102 also provides tools for customizing a luminance boost value for realistic light source blur in connection with lens blur effects. In particular, FIG. 19 illustrates a graphical user interface for displaying a modified digital image 1900 including a lens blur effect on a digital image with light source boosting. For instance, the client device displays a boost tool 1902 for customizing a boost amount to apply to luminance boost values.

To illustrate, the lens blur system 102 generates a highlight guide image for the digital image utilizing the processes described previously. The lens blur system 102 determines the boost amount according to the boost tool 1902 (e.g., in response to an input via a slider element or manually entered numerical value). The lens blur system 102 utilizes the boost amount with the highlight guide image to generate the modified digital image 1900 with realistic light blur by boosting light sources detected in the digital image via luminance boost values applied to pixels corresponding to the light source(s) in the digital image. More specifically, the lens blur system 102 utilizes the boost amount, highlight values, depth values, and blur radii to generate lens blur with light source boosting.

Figure 20:
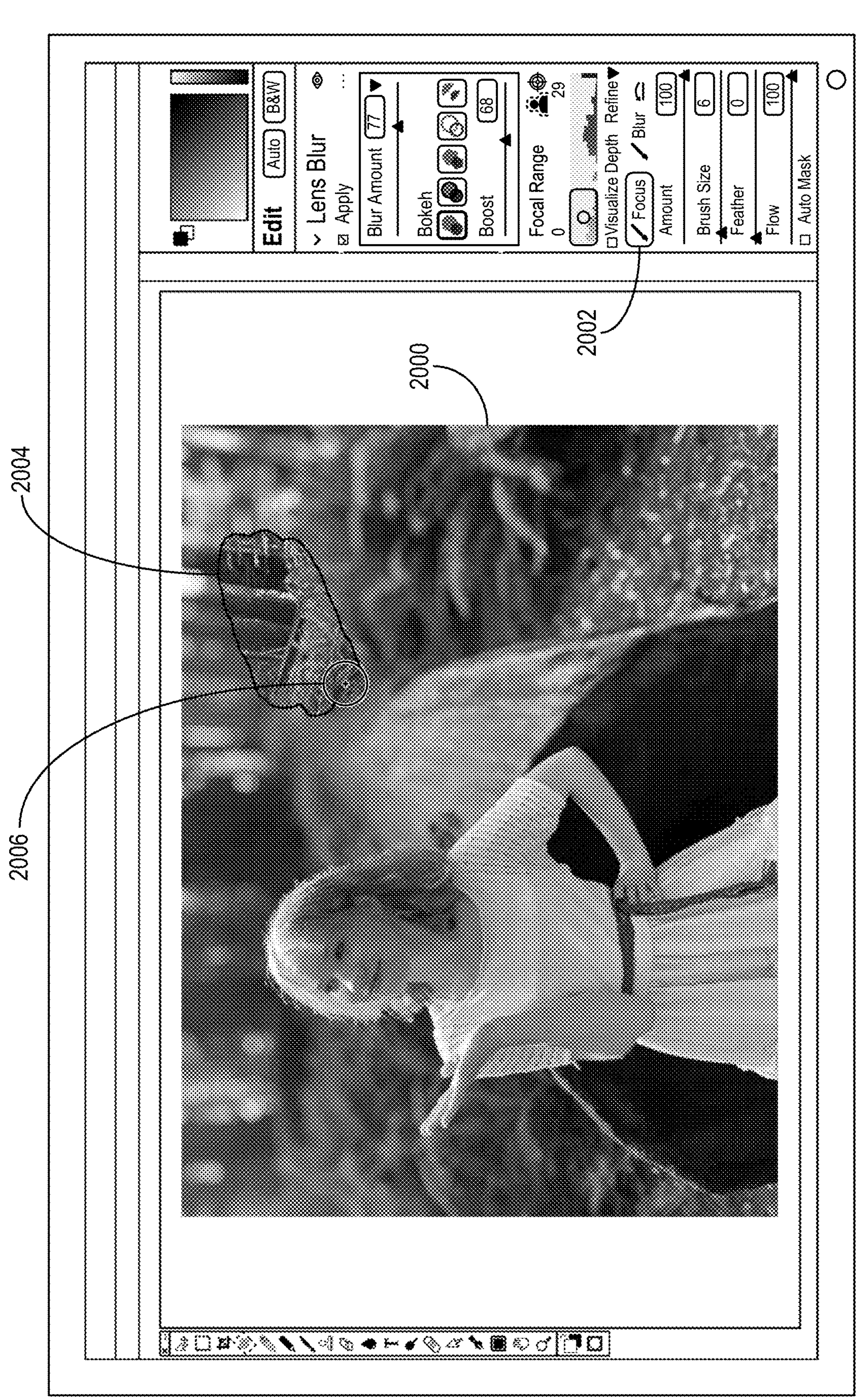
FIG. 20 illustrates a graphical user interface for correcting depth values in a depth map of a digital image in accordance with one or more implementations.

Furthermore, in one or more embodiments, the lens blur system 102 provides tools for correcting or refining depth values of selected regions in a digital image. FIG. 20 illustrates a graphical user interface for modifying depth values of selected portions of a digital image 2000. In particular, the lens blur system 102 provides a focus blur modification tool 2002 for selecting one or more portions of the digital image to modify depth values of the selected portion(s).

According to one or more embodiments, the lens blur system 102 determines the selected mode. For example, FIG. 20 illustrates that the focus blur modification tool 2002 includes a focus mode to focus (or unblur) the selected portion(s). Furthermore, the focus blur modification tool 2002 includes a blur mode to blur the selected portion(s). Additionally, the lens blur system 102 provides a tool for indicating or selecting a portion 2004 of the digital image 2000. As illustrated, the tool for indicating the portion 2004 includes a parametric brush tool for applying brush strokes or dabs to the digital image 2000.

In at least some embodiments, the tool includes customizable parameters including an amount (e.g., opacity), a brush size, a feather amount, and/or a flow amount. For example, the lens blur system 102 applies the brush strokes or dabs to the digital image 2000 utilizing the selected parameters and in connection with a cursor 2006 position relative to the digital image 2000. To illustrate, the lens blur system 102 detects an interaction with the digital image 2000 via the graphical user interface to select the portion 2004 with the cursor 2006 by applying a brush stroke or dab on the digital image 2000 utilizing the parametric brush parameters. Although FIG. 20 illustrates selection of a portion of a digital image utilizing a parametric brush, the lens blur system 102 alternatively provides tools for selecting a portion via a selection tool or other interface tool. In additional embodiments, the lens blur system 102 utilizes an automated masking process that identifies edges of objects (e.g., utilizing color/object identification) and selects portions of the digital image with edge awareness for accurately selecting objects at specific depths.

In response to determining the portion 2004 of the digital image 2000 to modify, the lens blur system 102 modifies depth values of pixels in the portion 2004. Specifically, as previously mentioned, the lens blur system 102 determines the selected mode (e.g., focus mode or blur mode) and modifies the fused depth values and layered depth values. For instance, the lens blur system 102 determines the focus range indicating the in-focus range of depth values and determines whether to move the depth values of the pixels in the portion 2004 toward the foreground or the background. As mentioned previously, in some embodiments, the lens blur system 102 modifies focal matte values in the focal matte for the portion 2004 according to the selected mode.

Figure 21:
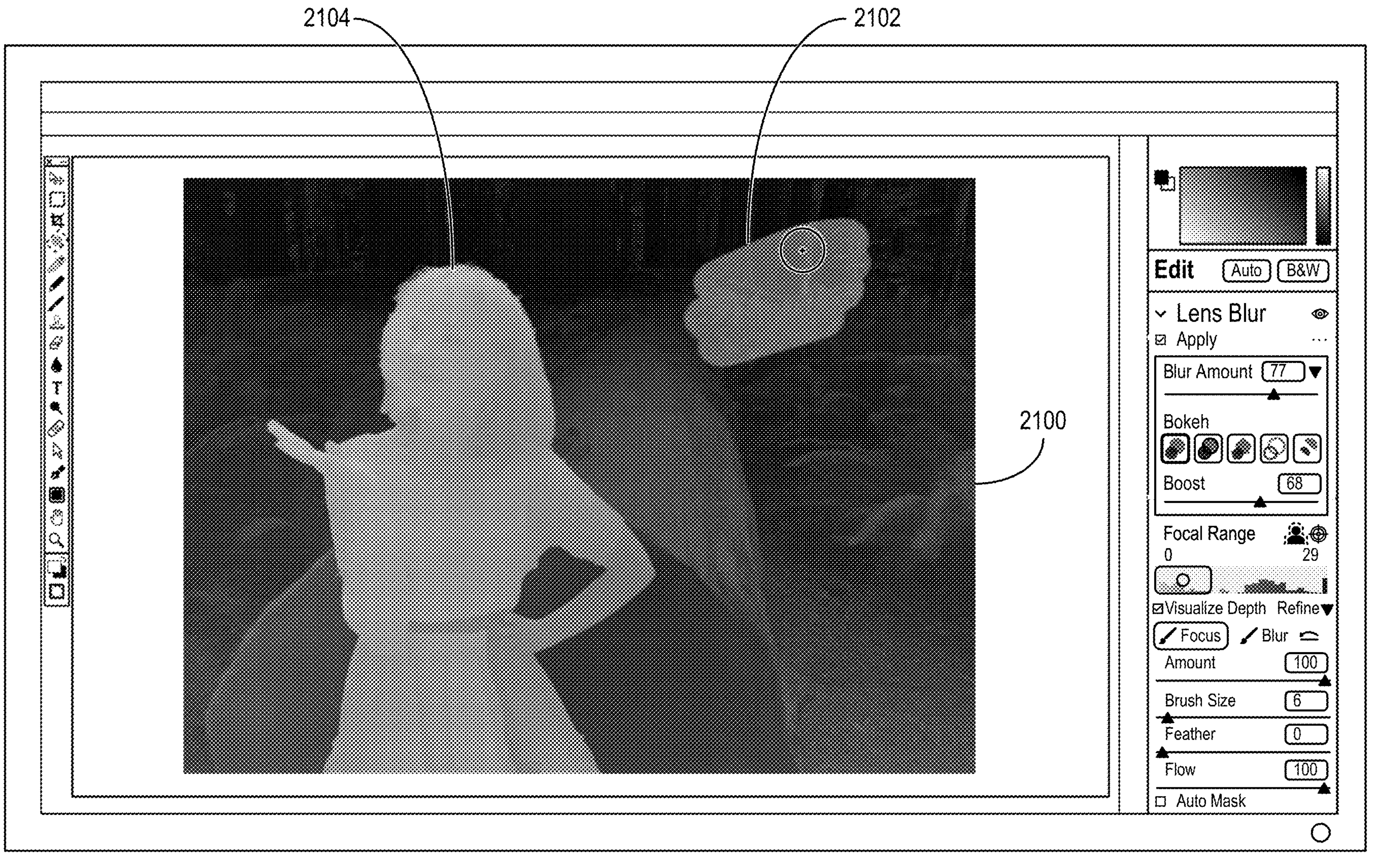
FIG. 21 illustrates a graphical user interface for displaying a modified depth map of a digital image in accordance with one or more implementations.

FIG. 21 illustrates a graphical user interface for interacting with a depth map 2100 of a digital image. For example, as illustrated, the lens blur system 102 determines a selected portion 2102 corresponding to a correction for modifying depth values of the depth map 2100. To illustrate, the lens blur system 102 determines that the selected portion 2102 of the depth map 2100 corresponds to the portion 2004 of the digital image 2000 of FIG. 20. Furthermore, as illustrated, the lens blur system 102 modifies the depth values of the selected portion 2102 to move toward a foreground of the depth map 2100 with similar depth values to a subject 2104 of the digital image in response to determining that the selected correction mode is a focus mode.

Figure 22:
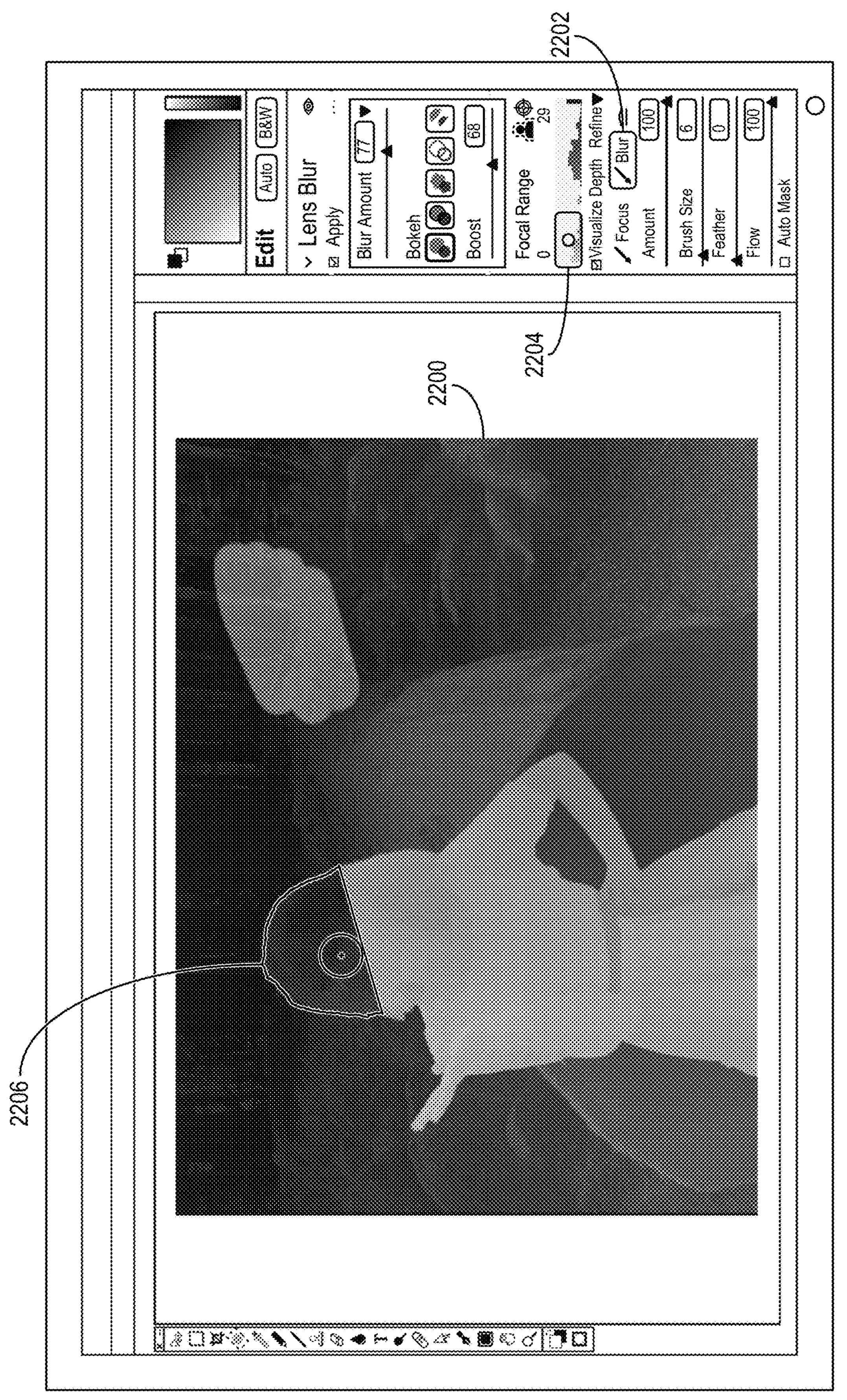
FIG. 22 illustrates a graphical user interface for displaying a modified depth map of a digital image in accordance with one or more implementations.

FIG. 22 illustrates a graphical user interface for interacting with a depth map 2200 of a digital image. In particular, as illustrated, the lens blur system 102 determines that a blur mode of a focus blur modification tool 2202 is selected. Accordingly, in response to interactions with the depth map 2200 via the focus blur modification tool 2202 (e.g., by drawing parametric brush strokes or dabs on the depth map 2200), the lens blur system 102 blurs selected portions of the digital image.

To illustrate, the lens blur system 102 determines a focus region (e.g., based on a position of a sliding window 2204) defining an in-focus range of depth values corresponding to a foreground focus (e.g., background defocus) for the digital image. For example, FIG. 22 illustrates a selected portion 2206 of the depth map 2200 in response to a cursor drawing a brushstroke on the depth map 2200. As illustrated, in response to determining that the selected portion 2206 corresponds to a foreground object (e.g., a set of pixels with depth values in the foreground), the lens blur system 102 blurs the selected portion 2206 by moving the depth values of the selected portion 2206 toward the background. For instance, the lens blur system 102 modifies the pixels of the selected portion 2206 to have depth values similar to pixels surrounding the selected portion.

Figure 23:
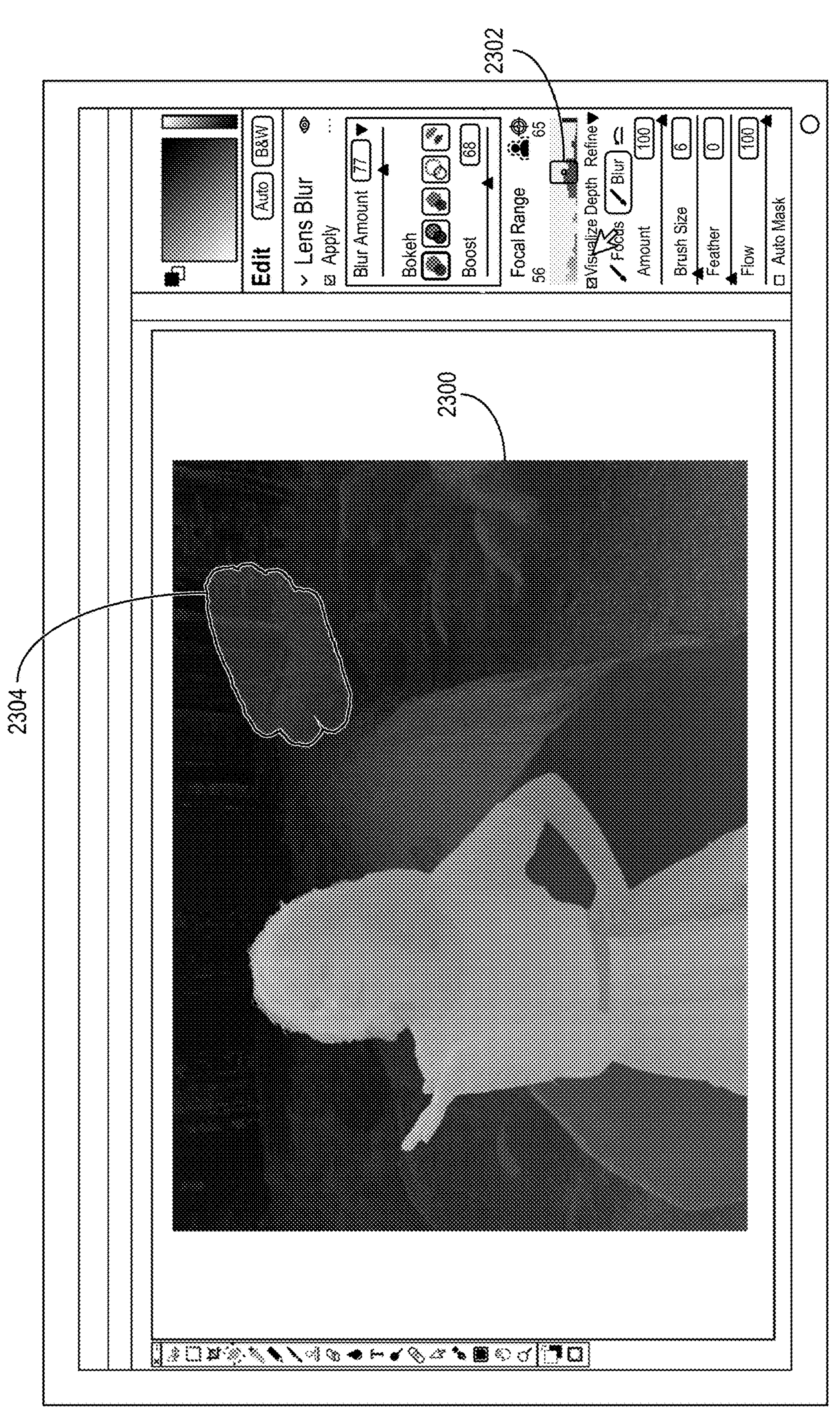
FIG. 23 illustrates a graphical user interface for displaying a modified depth map and a modified focus region of a digital image in accordance with one or more implementations.

Furthermore, in one or more embodiments, the lens blur system 102 provides one or more options for modifying a size and/or position of a focal region for a digital image. FIG. 23 illustrates a graphical user interface for displaying a depth map 2300 including a visual representation of depth values of a digital image. Specifically, the lens blur system 102 determines a focus range based on a size and a position of a sliding window 2302. To illustrate, as mentioned, the lens blur system 102 provides options for moving the sliding window 2302 toward foreground depth values or background depth values (or in between).

Additionally, the lens blur system 102 provides options for modifying a size of the sliding window 2302. For instance, the client device displays text input fields to indicate a minimum value and/or a maximum value for the in-focus range of depth values. To illustrate, the sliding window 2302 of FIG. 23 has a position and a size corresponding to a narrow range of depth values in the background (e.g., from "56-65" on a 100-point depth scale). In additional embodiments, the lens blur system 102 provides options for interacting with left or right edges of the sliding window 2302 to change the size of the sliding window 2302. Accordingly, in various embodiments, the lens blur system 102 determines whether the in-focus range of depth values are in the foreground, background, or somewhere in between based on the position and size of the sliding window 2302.

The lens blur system 102 utilizes the in-focus range of depth values to determine how to correct or refine depth values for a selected portion of a digital image. In particular, as illustrated in FIG. 23, the lens blur system 102 determines that a correction for a selected portion 2304 indicates a blur mode. Additionally, as mentioned, the lens blur system 102 compares the depth values of the selected portion 2304 to the in-focus range of depth values and modifies the depth values of the selected portion 2304 accordingly. To illustrate, in response to determining that the depth values of the selected portion 2304 are behind or near a back end of the in-focus range of depth values (e.g., farther in the background), the lens blur system 102 blurs the selected portion 2304 by modifying the depth values of the selected portion 2304 farther into the background. Alternatively, in response to determining that the depth values of the selected portion 2304 are in front of or near a front end of the in-focus range of depth values (e.g., farther in the foreground), the lens blur system 102 blurs the selected portion 2304 by modifying the depth values of the selected portion 2304 farther into the foreground.

In some embodiments, the lens blur system 102 modifies a previous correction to blur/unblur a portion of the digital image in response to a change in the focus region. For instance, in response to determining that the focus region shifts toward the background, the lens blur system 102 modifies a previous correction to blur a portion of the digital image by shifting the portion toward the foreground. In an additional example, the lens blur system 102 modifies a previous correction to unblur a portion of the digital image by shifting the portion toward the new in-focus range of values to keep the portion in focus.

Figure 24:
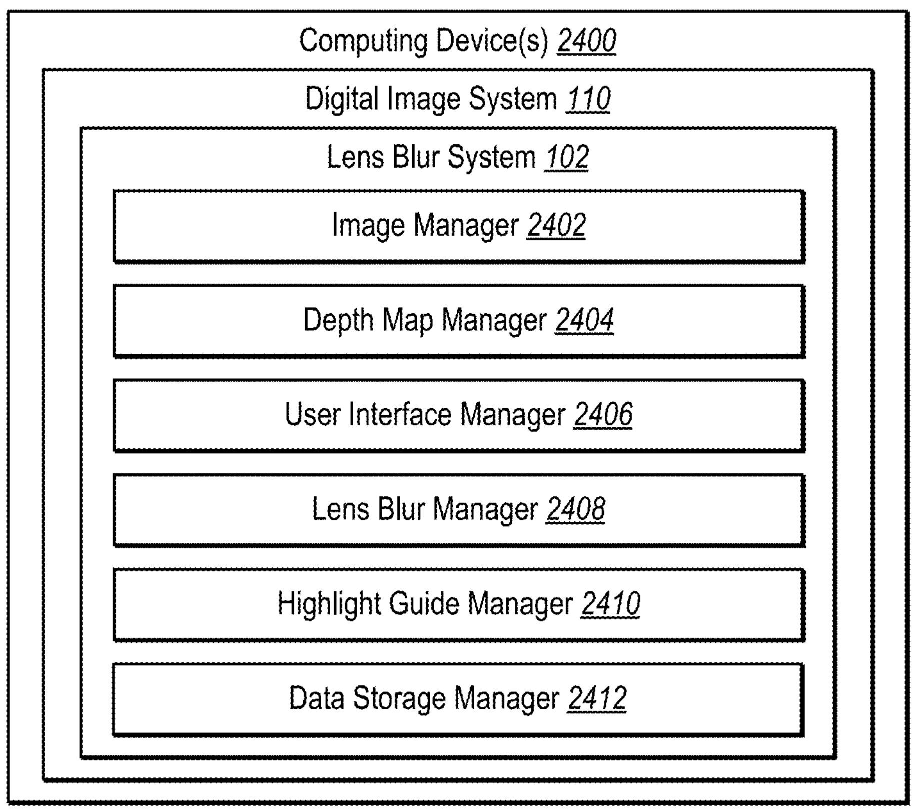
FIG. 24 illustrates an example schematic diagram of a lens blur system in accordance with one or more implementations.

FIG. 24 illustrates a detailed schematic diagram of an embodiment of the lens blur system 102 described above. As shown, the lens blur system 102 is implemented in an digital image system 110 on computing device(s) 2400 (e.g., a client device and/or server device as described in FIG. 1, and as further described below in relation to FIG. 28). Additionally, the lens blur system 102 includes, but is not limited to, an image manager 2402, a depth map manager 2404, a user interface manager 2406, a lens blur manager 2408, a highlight guide manager 2410, and a data storage manager 2412. In one or more embodiments, the lens blur system 102 is implemented on any number of computing devices. For example, the lens blur system 102 can be implemented in a distributed system of server devices for digital images. The lens blur system 102 can also be implemented within one or more additional systems. Alternatively, the lens blur system 102 can be implemented on a single computing device such as a single client device.

In one or more embodiments, each of the components of the lens blur system 102 is in communication with other components using any suitable communication technologies. Additionally, the components of the lens blur system 102 are capable of being in communication with one or more other devices including other computing devices of a user, server devices (e.g., cloud storage devices), licensing servers, or other devices/systems. It will be recognized that although the components of the lens blur system 102 are shown to be separate in FIG. 24, any of the subcomponents may be combined into fewer components, such as into a single component, or divided into more components as may serve a particular implementation. Furthermore, although the components of FIG. 24 are described in connection with the lens blur system 102, at least some of the components for performing operations in conjunction with the lens blur system 102 described herein may be implemented on other devices within the environment.

In some embodiments, the components of the lens blur system 102 include software, hardware, or both. For example, the components of the lens blur system 102 include one or more instructions stored on a computer-readable storage medium and executable by processors of one or more computing devices (e.g., the computing device(s) 2400). When executed by the one or more processors, the computer-executable instructions of the lens blur system 102 cause the computing device(s) 2400 to perform the operations described herein. Alternatively, the components of the lens blur system 102 include hardware, such as a special purpose processing device to perform a certain function or group of functions. Additionally, or alternatively, the components of the lens blur system 102 include a combination of computer-executable instructions and hardware.

Furthermore, the components of the lens blur system 102 performing the functions described herein with respect to the lens blur system 102 may, for example, be implemented as part of a stand-alone application, as a module of an application, as a plug-in for applications, as a library function or functions that may be called by other applications, and/or as a cloud-computing model. Thus, the components of the lens blur system 102 may be implemented as part of a stand-alone application on a personal computing device or a mobile device. Alternatively, or additionally, the components of the lens blur system 102 may be implemented in any application that provides digital image editing, including, but not limited to ADOBE® PHOTOSHOP®, ADOBE® LIGHTROOM®, and ADOBE® CREATIVE CLOUD® software.

As illustrated, the lens blur system 102 includes an image manager 2402 to manage digital images. In particular, the image manager 2402 generates, accesses, or otherwise obtains digital images for display and interaction within a graphical user interface. For example, the image manager 2402 accesses a digital image provided by a client device or from a digital image database. Furthermore, in some embodiments, the image manager 2402 manages one or more datasets including digital images for training one or more machine-learning models in connection with generating lens blur effects in digital images.

The lens blur system 102 also includes a depth map manager 2404 to generate or obtain depths for digital images. For example, the depth map manager 2404 utilizes one or more machine-learning models to generate initial estimated depth maps for digital images. Alternatively, the depth map manager 2404 obtains depth maps for digital images based on captured depth data for the digital images. Additionally, the depth map manager 2404 determines layered depth maps for digital images, such as by using one or more machine-learning models to generate background and foreground depth data for the digital images.

In additional embodiments, the lens blur system 102 includes a user interface manager 2406 to manage interactions with digital images and/or depth maps of digital images in connection with generating lens blur effects. For instance, the user interface manager 2406 detects interactions with one or more tools indicating blur parameters, in-focus ranges of depth values, corrections to depth values, and/or light source boosting in connection with lens blur parameters. Additionally, the user interface manager 2406 manages the display of digital images and rendering of lens blur effects via a non-destructive processing pipeline.

In one or more embodiments, the lens blur system 102 includes a lens blur manager 2408 to manage generation of lens blur effects for digital images. Specifically, the lens blur manager 2408 communicates with one or more other components (e.g., the depth map manager 2404 and the user interface manager 2406) to obtain depth data for generating lens blur effects. For example, the lens blur manager 2408 utilizes depth values from depth maps of digital images and blur parameters to modify depth values of portions of digital images in connection with generating the lens blur effects.

According to one or more embodiments, the lens blur system 102 includes a highlight guide manager 2410 to manage light source detection and boosting in digital images. For example, the highlight guide manager 2410 generates highlight guide images for digital images indicating light sources in the digital images. Additionally, the highlight guide manager 2410 communicates with the lens blur manager 2408 to generate lens blur effects with realistic light source blurring/boosting utilizing the highlight guide images.

The lens blur system 102 also includes a data storage manager 2412 (that comprises a non-transitory computer memory) that stores and maintains data associated with editing digital images. For example, the data storage manager 2412 stores digital images, depth maps, correction masks, and highlight guide images. The data storage manager 2412 also stores data for one or more machine-learning models and/or for training the machine-learning models to use in generating lens blur effects (e.g., via generation of depth maps and/or highlight guide images).

Figure 25:
FIG. 25 illustrates a flowchart for a series of acts for generating a lens blur effect with in-focus edge rendering for a digital image in accordance with one or more implementations.
Figure 25:
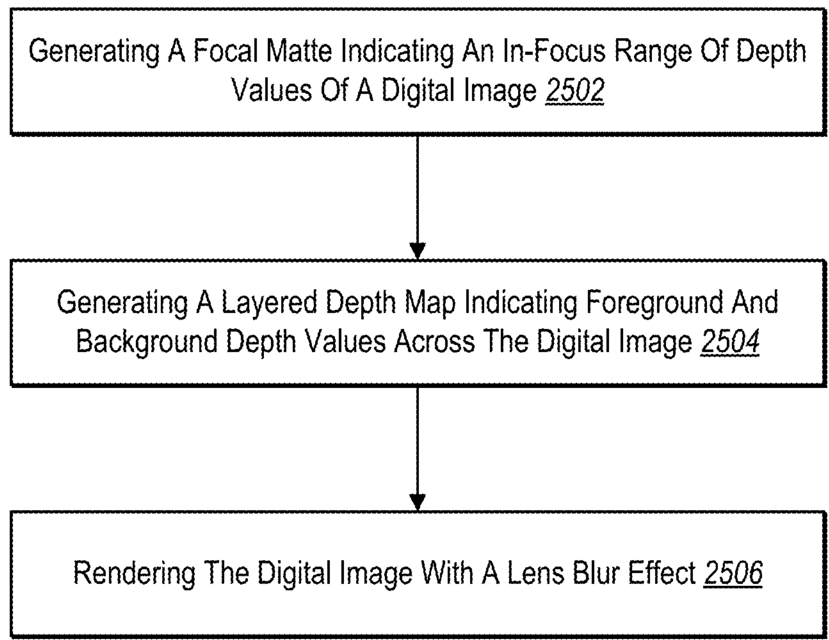

Turning now to FIG. 25, this figure shows a flowchart of a series of acts 2500 of generating a lens blur effect with in-focus edge rendering for a digital image. While FIG. 25 illustrates acts according to one embodiment, alternative embodiments may omit, add to, reorder, and/or modify any of the acts shown in FIG. 25. The acts of FIG. 25 are part of a method. Alternatively, a non-transitory computer readable medium comprises instructions, that when executed by one or more processors, cause the one or more processors to perform the acts of FIG. 25. In still further embodiments, a system includes a processor or server configured to perform the acts of FIG. 25.

As shown, the series of acts 2500 includes an act 2502 of generating a focal matte indicating an in-focus range of depth values of a digital image. Additionally, the series of acts 2500 includes an act 2504 of generating a layered depth map indicating foreground and background depth values across the digital image. The series of acts 2500 also includes an act 2506 of rendering the digital image with a lens blur effect.

In one or more embodiments, act 2502 involves generating a focal matte indicating an in-focus range of depth values of a digital image based on a focus region and a depth map of the digital image. In one or more embodiments, act 2504 involves generating a layered depth map comprising foreground depth values and background depth values of pixels across the digital image according to the depth map and the focal matte. In additional embodiments, act 2506 involves rendering the digital image to include a lens blur effect by utilizing the focal matte and the layered depth map to determine a combination of the foreground depth values and the background depth values in connection with a splatting operation.

For example, the series of acts 2500 involves providing, within a graphical user interface, a focal range selection tool comprising a sliding window with an adjustable range of depth values corresponding to a focus relative to a depth map of the digital image. Additionally, the series of acts 2500 involves determining the focus region in response to a position of the sliding window of the focal range selection tool.

The series of acts 2500 further involves providing, within the graphical user interface, the focal range selection tool with one or more options to adjust a size of the sliding window. The series of acts 2500 also involves determining the focus region based further on the size of the sliding window.

In one or more embodiments, the series of acts 2500 involves generating the focal matte by generating, for the digital image, a focus mask by thresholding depth values in the depth map according to the focus region. Additionally, the series of acts 2500 includes generating, for the digital image and based on the focus region, a trimap segmentation comprising one or more regions corresponding to discontinuities in the depth map. The series of acts 2500 further includes generating the focal matte by utilizing a matting model to generate matte values within an unknown region of the trimap segmentation and blending the focal matte values of the unknown region with the focus mask.

In some embodiments, the series of acts 2500 also includes generating, utilizing the focal matte as a guide mask for a refinement machine-learning model, the foreground depth values and the background depth values over all pixels of the digital image according to the in-focus range of depth values.

In some embodiments, the series of acts 2500 further includes generating a fused depth map comprising fused depth values of pixels in the digital image by utilizing the focal matte to generate a fused depth value by linearly interpolating between a foreground depth value and a background depth value corresponding to a particular pixel from the layered depth map. Additionally, the series of acts 2500 include rendering the digital image utilizing the fused depth value of the particular pixel in connection with the splatting operation.

In one or more embodiments, the series of acts 2500 includes determining splat sizes of the splatting operation for the pixels of the digital image based on fused depth values of the fused depth map. The series of acts 2500 further includes generating the lens blur effect by integrating splat values for the pixels of the digital image according to the splat sizes. In some embodiments, the series of acts 2500 includes determining, for the particular pixel, that a focal matte value from the focal matte is greater than a threshold value above zero. The series of acts 2500 also includes modulating a splat weight for the particular pixel by the focal matte value.

In one or more embodiments, the series of acts 2500 includes providing, for display via a graphical user interface, a focal range selection tool comprising an adjustable range of depth values corresponding to a focus relative to a depth map of the digital image. The series of acts 2500 also includes generating a focal matte indicating an in-focus range of depth values of a digital image based on a selected focus region via the focal range selection tool and a trimap segmentation corresponding to discontinuities in the depth map. Additionally, the series of acts 2500 includes generating a layered depth map comprising a set of foreground depth values of pixels of the digital image and a set of background depth values of the pixels of the digital image according to the depth map and the focal matte. The series of acts 2500 further includes rendering the digital image with a lens blur effect by utilizing the focal matte to determine fused depth values by interpolating between the set of foreground depth values and the set of background depth values of the layered depth map in connection with a splatting operation.

In one or more embodiments, the series of acts 2500 includes determining, in response to a user input via the focal range selection tool, a position of a sliding window indicating the adjustable range of depth values corresponding to the focus relative to the depth map. Additionally, the series of acts 2500 includes generating the focal matte by modifying a size of the adjustable range of depth values in response to an additional user input changing a position of an edge of the sliding window.

According to one or more embodiments, the series of acts 2500 includes generating a focus mask by thresholding depth values in the depth map according to the selected focus region. The series of acts 2500 also includes generating, based on the focus mask and the depth map, the trimap segmentation indicating an unknown region corresponding to discontinuities in the focus mask. The series of acts 2500 further includes generating the focal matte by blending focal matte values of the unknown region of the trimap segmentation with the focus mask.

In one or more embodiments, the series of acts 2500 include generating, utilizing a refinement machine-learning model guided by the focal matte, the set of foreground depth values in a foreground map and the set of background depth values in a background map, the foreground map overlapping the background map.

According to one or more embodiments, the series of acts 2500 includes determining, for a pixel of the digital image, a splat size of the splatting operation based on a fused depth value corresponding to the pixel. Additionally, the series of acts 2500 includes generating the lens blur effect by integrating a splat value for the pixel determined according to the splat size with splat values of adjacent pixels.

In some embodiments, the series of acts 2500 also includes determining, for a pixel of the digital image, that a focal matte value from the focal matte is greater than a threshold value. The series of acts 2500 further includes modulating a splat weight for the pixel by the focal matte value in connection with the splatting operation.

In one or more embodiments, the series of acts 2500 includes determining, in response to an input via a graphical user interface, a focus mask comprising an in-focus range of depth values according to a depth map of a digital image indicated by a focus region. The series of acts 2500 further includes generating a focal matte by refining edges of the focus mask according to discontinuities in the depth map. Additionally, the series of acts 2500 includes generating a layered depth map comprising foreground depth values and background depth values of pixels of the digital image according to the depth map and the focal matte. The series of acts 2500 also includes rendering the digital image to include a lens blur effect by utilizing the focal matte and the layered depth map to determine a combination of the foreground depth values and the background depth values in connection with a splatting operation.

In some embodiments, the series of acts 2500 includes providing, within the graphical user interface, a focal range selection tool comprising a sliding window with an adjustable position and an adjustable size for indicating an adjustable range of depth values corresponding to a focus relative to a depth map of the digital image. The series of acts 2500 also includes determining the focus region based on a position and a size indicated by the sliding window of the focal range selection tool.

Additionally, the series of acts 2500 includes generating, for the digital image, the focus mask by thresholding depth values in the depth map according to the focus region. The series of acts 2500 also includes generating, for the digital image and based on the focus mask and the depth map, a trimap segmentation comprising an unknown region representing discontinuities in the depth map. Furthermore, the series of acts 2500 includes generating the focal matte by blending focal matte values in the unknown region with the focus mask.

In some embodiments, the series of acts 2500 includes determining, for the pixels of the digital image, splat sizes based on the combination of the foreground depth values and the background depth values according to the focal matte. Additionally, the series of acts 2500 includes modulating one or more splat weights for one or more pixels according to corresponding focal matte values from the focal matte. The series of acts 2500 also includes generating the lens blur effect by generating splat values for the pixels of the digital image according to the splat sizes of the pixels of the digital image.

Figure 26:
FIG. 26 illustrates a flowchart for a series of acts for interactively correcting depth values in a depth map in connection with generating a lens blur effect for a digital image in accordance with one or more implementations.
Figure 26:
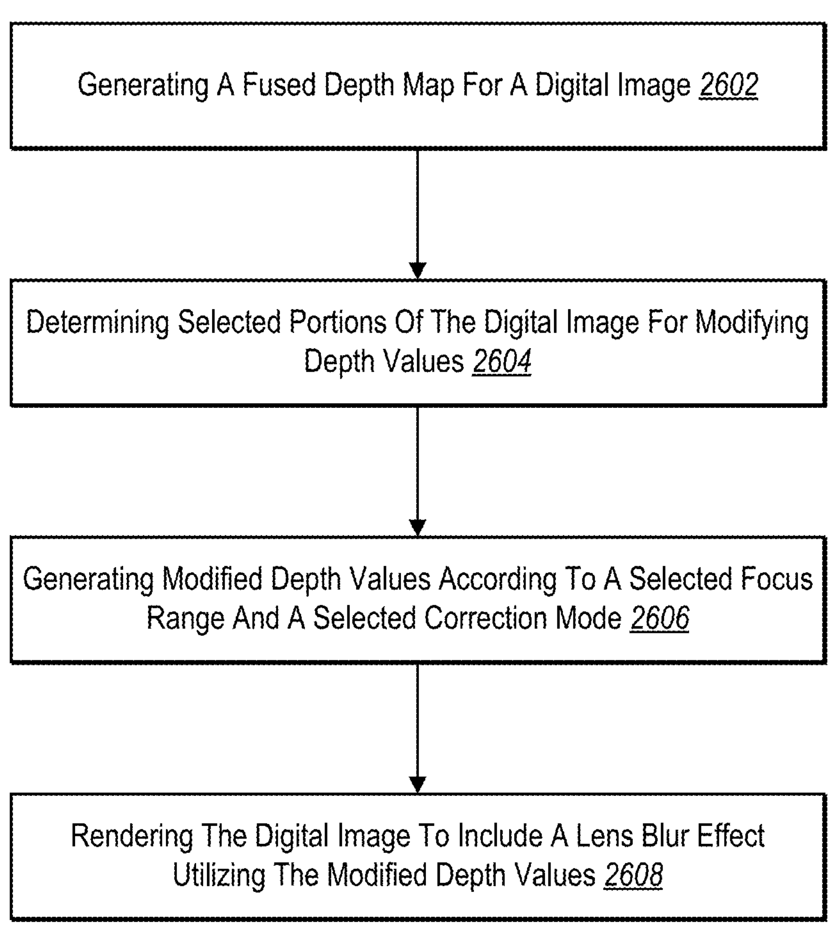

Turning now to FIG. 26, this figure shows a flowchart of a series of acts 2600 of interactively correcting depth values in a depth map in connection with generating a lens blur effect for a digital image. While FIG. 26 illustrates acts according to one embodiment, alternative embodiments may omit, add to, reorder, and/or modify any of the acts shown in FIG. 26. The acts of FIG. 26 are part of a method. Alternatively, a non-transitory computer readable medium comprises instructions, that when executed by one or more processors, cause the one or more processors to perform the acts of FIG. 26. In still further embodiments, a system includes a processor or server configured to perform the acts of FIG. 26.

As shown, the series of acts 2600 includes an act 2602 of generating a fused depth map for a digital image. Additionally, the series of acts 2600 includes an act 2604 of determining selected portions of the digital image for modifying depth values. The series of acts 2600 also includes an act 2606 of generating modified depth values according to a selected focus range and a selected correction mode. The series of acts 2600 further includes an act 2608 of rendering the digital image to include a lens blur effect utilizing the modified depth values.

In one or more embodiments, act 2602 involves generating a fused depth map comprising a combination of foreground depth values and background depth values from a layered depth map of pixels of a digital image and a focal matte indicating an in-focus range of depth values of the digital image. Act 2604 involves determining, in response to an interaction with the digital image via a focus blur modification tool in a graphical user interface, one or more selected portions of the digital image for modifying depth values of the digital image. Act 2606 involves generating modified depth values for the one or more selected portions of the digital image by modifying the fused depth map, the foreground depth values, and the background depth values according to a selected focus range and a selected correction mode. Furthermore, act 2608 involves rendering the digital image to include a lens blur effect utilizing the modified depth values of the one or more selected portions of the digital image.

In one or more embodiments, the series of acts 2600 includes linearly interpolating between foreground depth values and background depth value corresponding to pixels from the layered depth map.

In some embodiments, the series of acts 2600 includes providing, for display within a graphical user interface, a focus blur modification tool for indicating one or more portions of the digital image for modifying depth values of the digital image. The series of acts 2600 also include determining the one or more selected portions of the digital image in response to an interaction with the focus blur modification tool. For example, the series of acts 2600 includes determining one or more parametric brush dabs indicating the one or more selected portions according to brushstroke parameters of the focus blur modification tool. Additionally, the series of acts 2600 includes generating a correction mask comprising the one or more selected portions in response to the interaction with the focus blur modification tool.

In one or more embodiments, the series of acts 2600 includes determining that the selected correction mode indicates a request to unblur the one or more selected portions. Furthermore, the series of acts 2600 includes modifying the foreground depth values, the background depth values, and fused depth values of the fused depth map to a nearest depth value within the in-focus range of depth values. For example, the series of acts 2600 includes determining, for a pixel of the digital image, that a focal matte value of the focal matte is greater than zero. Additionally, the series of acts 2600 includes setting the focal matte value of the pixel to indicate a foreground region for the pixel.

In one or more embodiments, the series of acts 2600 includes determining that the selected correction mode indicates a request to blur the one or more selected portions. Additionally, the series of acts 2600 includes comparing one or more fused depth values for a subset of pixels in the one or more selected portions to the in-focus range of depth values. The series of acts 2600 further includes generating a modified depth value of a pixel in the one or more selected portions by increasing or decreasing a depth value of the pixel in the one or more selected portions based on a comparison of a fused depth value of the pixel to the in-focus range of depth values.

In some embodiments, the series of acts 2600 includes determining, based on the comparison of the fused depth value of the pixel to the in-focus range of depth values, that the selected correction mode indicates a foreground defocus for the one or more selected portions. The series of acts 2600 also includes modifying the fused depth value of the pixel and a background depth value of the pixel to be equal to a foreground depth value of the pixel. For example, the series of acts 2600 includes determining, based on the comparison of the fused depth value of the pixel to the in-focus range of depth values, that the selected correction mode indicates a background defocus for the one or more selected portions. Additionally, the series of acts 2600 includes modifying the fused depth value of the pixel and a foreground depth value of the pixel to be equal to a background depth value of the pixel.

In one or more embodiments, the series of acts 2600 includes determining a blur amount for the lens blur effect according to the selected correction mode. The series of acts 2600 also includes determining interpolated depth values by interpolating between initial depth values of the one or more selected portions of the digital image and the modified depth values of the one or more selected portions according to the blur amount. Additionally, the series of acts 2600 includes rendering the digital image including the lens blur effect in the one or more selected portions of the digital image utilizing the interpolated depth values.

In one or more embodiments, the series of acts 2600 includes determining parameters of the focus blur modification tool. The series of acts 2600 also includes generating, utilizing the parameters of the focus blur modification tool, a correction mask comprising the one or more selected portions in response to the interaction with the digital image via the focus blur modification tool.

In some embodiments, the series of acts 2600 includes determining that the selected correction mode indicates a request to unblur the one or more selected portions. The series of acts 2600 further includes modifying the foreground depth values, the background depth values, and fused depth values of the fused depth map to a depth value within the in-focus range of depth values.

In at least some embodiments, the series of acts 2600 includes determining that the selected correction mode indicates a request to blur the one or more selected portions. The series of acts 2600 further includes modifying the foreground depth values, the background depth values, and the fused depth map according to the selected correction mode indicating the request to blur or unblur the one or more selected portions.

According to some embodiments, the series of acts 2600 includes setting the foreground depth values, the background depth values, and fused depth values of the fused depth map of the one or more selected portions to a foreground depth value in response to determining that the request to blur the one or more selected portions indicates a foreground defocus for the one or more selected portions. The series of acts 2600 alternatively includes setting the foreground depth values, the background depth values, and fused depth values of the fused depth map of the one or more selected portions to a background depth value in response to determining that the request to blur the one or more selected portions indicates a background defocus for the one or more selected portions.

In one or more embodiments, the series of acts 2600 includes generating a fused depth map comprising a combination of foreground depth values and background depth values from a layered depth map of pixels of a digital image and a focal matte indicating an in-focus range of depth values of the digital image. Additionally, the series of acts 2600 includes generating modified depth values for one or more selected portions of the digital image by modifying the fused depth map, the foreground depth values, and the background depth values according to a selected focus range and a selected correction mode comprising a focus mode or a blur mode. In some embodiments, the series of acts 2600 includes rendering the digital image to include a lens blur effect utilizing the modified depth values to unblur or blur the one or more selected portions of the digital image according to the selected correction mode.

In one or more embodiments, the series of acts 2600 includes providing, for display within a graphical user interface, a focus blur modification tool comprising an option to indicate the selected correction mode. The series of acts 2600 also includes determining the one or more selected portions of the digital image according to the selected correction mode in response to one or more brush dabs.

Additionally, in some embodiments, the series of acts 2600 includes moving depth values for the one or more selected portions toward a foreground depth of the digital image or a background depth of the digital image according to the selected correction mode.

In some embodiments, the series of acts 2600 includes determining interpolated depth values by linearly interpolating between initial depth values of the one or more selected portions and the modified depth values according to the selected focus range. Furthermore, the series of acts 2600 includes rendering the digital image including the lens blur effect in the one or more selected portions utilizing the interpolated depth values.

Figure 27:
FIG. 27 illustrates a flowchart for a series of acts for generating and utilizing a highlight guide image to boost luminance values of light sources in connection with generating a lens blur effect for a digital image in accordance with one or more implementations.
Figure 27:
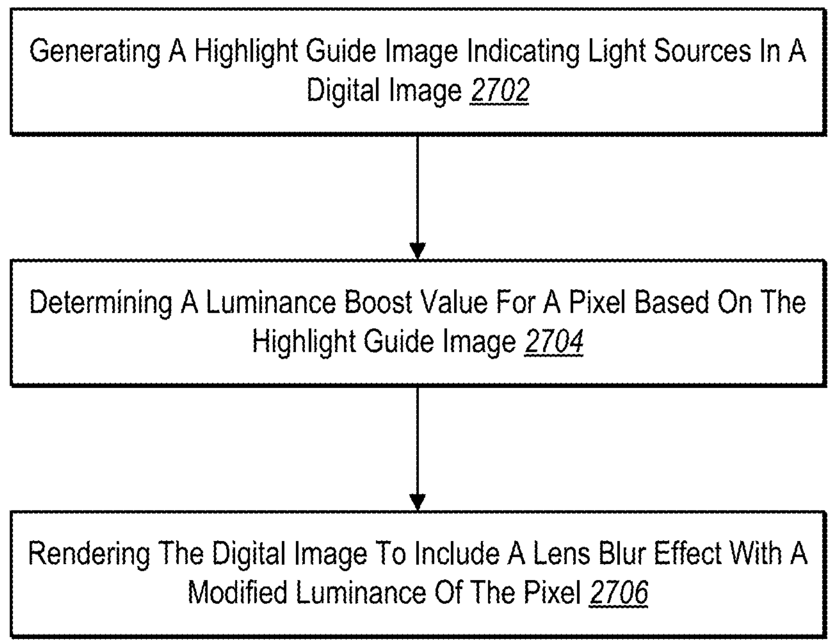

Turning now to FIG. 27, this figure shows a flowchart of a series of acts 2700 of generating and utilizing a highlight guide image to boost luminance values of light sources in connection with generating a lens blur effect for a digital image. While FIG. 27 illustrates acts according to one embodiment, alternative embodiments may omit, add to, reorder, and/or modify any of the acts shown in FIG. 27. The acts of FIG. 27 are part of a method. Alternatively, a non-transitory computer readable medium comprises instructions, that when executed by one or more processors, cause the one or more processors to perform the acts of FIG. 27. In still further embodiments, a system includes a processor or server configured to perform the acts of FIG. 27.

As shown, the series of acts 2700 includes an act 2702 of generating a highlight guide image indicating light sources in a digital image. Additionally, the series of acts 2700 includes an act 2704 of determining a luminance boost value for a pixel based on the highlight guide image. The series of acts 2700 further include an act 2706 of rendering the digital image to include a lens blur effect with a modified luminance of the pixel.

In one or more embodiments, act 2702 involves generating, in response to a request to apply a lens blur effect to the digital image, a highlight guide image comprising visual indications of one or more light sources in the digital image. Furthermore, act 2704 involves determining a luminance boost value for a pixel corresponding to the one or more light sources based on a luminance value of the pixel in the digital image, a highlight value of the pixel in the highlight guide image, and a blur value. Additionally, act 2706 involves rendering the digital image to include the lens blur effect by generating a modified luminance value of the pixel according to the luminance boost value.

In one or more embodiments, the series of acts 2700 includes determining a gradient mask by detecting edges of a luminance map comprising luminance values of pixels in a digital image. Additionally, in one or more embodiments, the series of acts 2700 includes determining a highlight mask by thresholding the luminance map to determine a subset of pixels with luminance values meeting a threshold luminance. Furthermore, the series of acts 2700 further includes generating a gradient-highlight mask including pixel values from a combination of the gradient mask and the highlight mask. In some embodiments, the series of acts 2700 includes generating a highlight guide image comprising indications of one or more light sources in the digital image based on the gradient-highlight mask and the highlight mask.

In one or more embodiments, the series of acts 2700 includes generating the luminance map for the digital image by downsampling the digital image and determining the luminance values of the pixels. In some embodiments, the series of acts 2700 includes determining the highlight mask further by applying a tone curve filter to the subset of pixels with luminance values above the threshold luminance. Furthermore, in some embodiments, the series of acts 2700 includes generating the gradient-highlight mask by multiplying the gradient mask and the highlight mask to create the gradient-highlight mask.

In some embodiments, the series of acts 2700 includes generating gradients from the luminance map by applying a Laplacian filter to the luminance map. The series of acts 2700 also includes determining the gradient mask by selecting a subset of the gradients that meet a threshold gradient value.

In one or more embodiments, the series of acts 2700 includes generating an inverse of the gradient-highlight mask. The series of acts 2700 further includes generating the highlight guide image by combining the gradient-highlight mask, the inverse of the gradient-highlight mask, and the highlight mask. In at least some embodiments, the series of acts 2700 includes generating the highlight guide image by combining the gradient-highlight mask, the inverse of the gradient-highlight mask, and the highlight mask via a weighted sum of the gradient-highlight mask, the inverse of the gradient-highlight mask, and the highlight mask.

In one or more embodiments, the series of acts 2700 includes determining, in response to a request to apply a lens blur effect to the digital image, a luminance boost value for a pixel of the one or more light sources based on a highlight value of the pixel in the highlight guide image and a luminance value of the pixel in the digital image. In some embodiments, the series of acts 2700 includes determining the luminance boost value for the pixel by determining the luminance boost value further based on a local blur radius associated with the lens blur effect. Additionally, the series of acts 2700 includes rendering the digital image to include the lens blur effect according to the luminance boost value of the pixel.

In one or more embodiments, the series of acts 2700 includes generating the highlight guide image utilizing a machine-learning model comprising parameters learned on highlight guide images and corresponding digital images from a digital image repository.

In one or more embodiments, the series of acts 2700 includes determining a gradient mask indicating edges in a luminance map of the digital image. Additionally, the series of acts 2700 includes determining a highlight mask comprising a subset of pixels with luminance values above a threshold luminance. The series of acts 2700 also includes generating a gradient-highlight mask by combining the gradient mask and the highlight mask. Furthermore, the series of acts 2700 includes generating the highlight guide image based on the gradient-highlight mask and the highlight mask.

In one or more embodiments, the series of acts 2700 includes generate a mapping between the highlight guide image and the digital image. Furthermore, the series of acts 2700 includes generating the highlight guide image as a separate file associated with the digital image according to the mapping. In some embodiments, the series of acts 2700 includes opening the digital image within a digital image application. Additionally, the series of acts 2700 includes accessing, in response to opening the digital image, the highlight guide image mapped to the digital image in connection with editing the digital image in the digital image application.

In some embodiments, the series of acts 2700 includes generating an additional version of the digital image by modifying a resolution of the digital image. The series of acts 2700 also includes rendering the additional version of the digital image including an additional lens blur effect according to the highlight guide image associated with the digital image.

In one or more embodiments, the series of acts 2700 includes determining a boost amount in response to an input via a boost setting within a graphical user interface displaying the digital image. Additionally, the series of acts 2700 includes selecting highlight values from the highlight guide image by modifying a luminance threshold based on the boost amount, the highlight values comprising a highlight value of the pixel. The series of acts 2700 also includes determining a scaling amount for the highlight value of the pixel based on the boost amount.

According to one or more embodiments, the series of acts 2700 includes generating a gradient-highlight mask by: detecting edges of a luminance map of a digital image; and determining a subset of pixels of the digital image with luminance values above a luminance threshold. Additionally, in one or more embodiments, the series of acts 2700 includes generating a highlight guide image comprising indications of one or more light sources in the digital image by combining the gradient-highlight mask, an inverse of the gradient-highlight mask, and the edges of the luminance map. The series of acts 2700 also includes rendering the digital image to include a lens blur effect by utilizing the highlight guide image to modify luminance values of one or more pixels of the digital image.

In one or more embodiments, the series of acts 2700 includes applying a gradient detection filter to the luminance map. The series of acts 2700 also includes selecting a subset of gradients that meet a threshold gradient value.

In one or more embodiments, the series of acts 2700 includes determining luminance boost values for the one or more pixels of the digital image based on a boost amount in response to an input via a boost setting in a request to apply the lens blur effect to the digital image. Additionally, the series of acts 2700 includes modifying the luminance values of the one or more pixels of the digital image according to the luminance boost values.

In some embodiments, the series of acts 2700 includes generating the highlight guide image as metadata of the digital image. The series of acts 2700 further includes rendering a plurality of versions of the digital image with a plurality of different lens blur effects by accessing the highlight guide image for each of the plurality of different lens blur effects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 28:
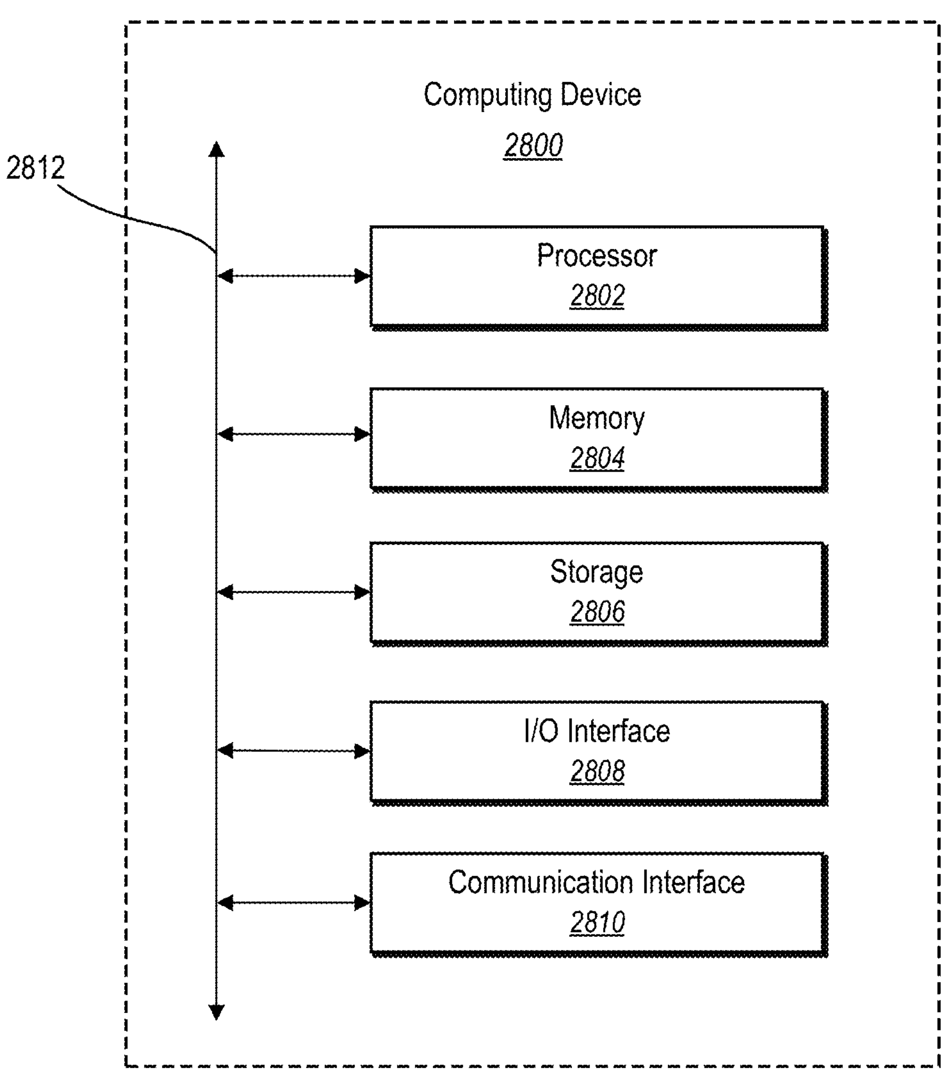
FIG. 28 illustrates a block diagram of an exemplary computing device in accordance with one or more implementations.

FIG. 28 illustrates a block diagram of an example computing device 2800 that may be configured to perform one or more of the processes described above. One will appreciate that one or more computing devices, such as the computing device 2800 may represent the computing devices described above (e.g., server device(s) 104 and client device 106). In one or more embodiments, the computing device 2800 may be a mobile device (e.g., a mobile telephone, a smartphone, a PDA, a tablet, a laptop, a camera, a tracker, a watch, a wearable device, etc.). In some embodiments, the computing device 2800 may be a non-mobile device (e.g., a desktop computer or another type of client device). Further, the computing device 2800 may be a server device that includes cloud-based processing and storage capabilities.

As shown in FIG. 28, the computing device 2800 can include one or more processor(s) 2802, memory 2804, a storage device 2806, input/output interfaces 2808 (or "I/O interfaces 2808"), and a communication interface 2810, which may be communicatively coupled by way of a communication infrastructure (e.g., bus 2812). While the computing device 2800 is shown in FIG. 28, the components illustrated in FIG. 28 are not intended to be limiting. Additional or alternative components may be used in other embodiments. Furthermore, in certain embodiments, the computing device 2800 includes fewer components than those shown in FIG. 28. Components of the computing device 2800 shown in FIG. 28 will now be described in additional detail.

In particular embodiments, the processor(s) 2802 includes hardware for executing instructions, such as those making up a computer program. As an example, and not by way of limitation, to execute instructions, the processor(s) 2802 may retrieve (or fetch) the instructions from an internal register, an internal cache, memory 2804, or a storage device 2806 and decode and execute them.

The computing device 2800 includes memory 2804, which is coupled to the processor(s) 2802. The memory 2804 may be used for storing data, metadata, and programs for execution by the processor(s). The memory 2804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2804 may be internal or distributed memory.

The computing device 2800 includes a storage device 2806 includes storage for storing data or instructions. As an example, and not by way of limitation, the storage device 2806 can include a non-transitory storage medium described above. The storage device 2806 may include a hard disk drive (HDD), flash memory, a Universal Serial Bus (USB) drive or a combination these or other storage devices.

As shown, the computing device 2800 includes one or more I/O interfaces 2808, which are provided to allow a user to provide input to (such as user strokes), receive output from, and otherwise transfer data to and from the computing device 2800. These I/O interfaces 2808 may include a mouse, keypad or a keyboard, a touch screen, camera, optical scanner, network interface, modem, other known I/O devices or a combination of such I/O interfaces 2808. The touch screen may be activated with a stylus or a finger.

The I/O interfaces 2808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2808 are configured to provide graphical data to a display for presentation to a user. The graphical data may be representative of one or more graphical user interfaces and/or any other graphical content as may serve a particular implementation.

The computing device 2800 can further include a communication interface 2810. The communication interface 2810 can include hardware, software, or both. The communication interface 2810 provides one or more interfaces for communication (such as, for example, packet-based communication) between the computing device and one or more other computing devices or one or more networks. As an example, and not by way of limitation, communication interface 2810 may include a network interface controller (NIC) or network adapter for communicating with an Ethernet or other wire-based network or a wireless NIC (WNIC) or wireless adapter for communicating with a wireless network, such as a WI-FI. The computing device 2800 can further include a bus 2812. The bus 2812 can include hardware, software, or both that connects components of computing device 2800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining, by at least one processor, a gradient mask by applying a gradient filter to a luminance map comprising luminance values of pixels in a digital image to detect edges indicating boundaries in the luminance map;

determining, by the at least one processor, a highlight mask by thresholding the luminance map to determine a subset of pixels with luminance values meeting a threshold luminance;

generating, by the at least one processor, a gradient-highlight mask by selecting pixel values that are included in the gradient mask and the highlight mask; and generating, by the at least one processor, a highlight guide image comprising indications of one or more light sources in the digital image based on the gradient-highlight mask and the highlight mask.

2. The computer-implemented method of claim 1, further comprising generating the luminance map for the digital image by downsampling the digital image and determining the luminance values of the pixels.

3. The computer-implemented method of claim 1, wherein determining the gradient mask comprises:

generating gradients from the luminance map by applying a Laplacian filter to the luminance map; and determining the gradient mask by selecting a subset of the gradients that meet a threshold gradient value.

4. The computer-implemented method of claim 1, wherein determining the highlight mask further comprises applying a tone curve filter to the subset of pixels with luminance values above the threshold luminance.

5. The computer-implemented method of claim 1, wherein generating the gradient-highlight mask comprises multiplying the gradient mask and the highlight mask to create the gradient-highlight mask.

6. The computer-implemented method of claim 1, wherein generating the highlight guide image comprises:

generating an inverse of the gradient-highlight mask; and generating the highlight guide image by combining the gradient-highlight mask, the inverse of the gradient-highlight mask, and the highlight mask.

7. The computer-implemented method of claim 6, wherein generating the highlight guide image comprises combining the gradient-highlight mask, the inverse of the gradient-highlight mask, and the highlight mask via a weighted sum of the gradient-highlight mask, the inverse of the gradient-highlight mask, and the highlight mask.

8. The computer-implemented method of claim 1, further comprising:

determining, in response to a request to apply a lens blur effect to the digital image, a luminance boost value for a pixel of the one or more light sources based on a highlight value of the pixel in the highlight guide image and a luminance value of the pixel in the digital image; and rendering the digital image to include the lens blur effect according to the luminance boost value of the pixel.

9. The computer-implemented method of claim 8, wherein determining the luminance boost value for the pixel comprises determining the luminance boost value further based on a local blur radius associated with the lens blur effect.

10. A system comprising:

a memory component; and one or more processing devices coupled to the memory component, the one or more processing devices to perform operations comprising:

generating, in response to a request to apply a lens blur effect to a digital image, a highlight guide image comprising visual indications of one or more light sources in the digital image based on a gradient-highlight mask and a highlight mask, the gradient-highlight mask comprising pixel values included in a gradient mask and the highlight mask;

determining a luminance boost value for a pixel corresponding to the one or more light sources based on a luminance value of the pixel in the digital image, a highlight value of the pixel in the highlight guide image, and a blur value; and rendering the digital image to include the lens blur effect by generating a modified luminance value of the pixel according to the luminance boost value.

11. The system of claim 10, wherein generating the highlight guide image comprises generating the highlight guide image utilizing a machine-learning model comprising parameters learned on highlight guide images and corresponding digital images from a digital image repository.

12. The system of claim 10, wherein generating the highlight guide image comprises:

determining the gradient mask indicating edges in a luminance map of the digital image;

determining the highlight mask comprising a subset of pixels with luminance values above a threshold luminance;

generating the gradient-highlight mask by selecting pixel values that are included in the gradient mask and the highlight mask; and generating the highlight guide image based on the gradient-highlight mask and the highlight mask.

13. The system of claim 10, wherein the operations further comprise:

generating a mapping between the highlight guide image and the digital image; and generating the highlight guide image as a separate file associated with the digital image according to the mapping.

14. The system of claim 13, wherein the operations further comprise:

opening the digital image within a digital image application; and accessing, in response to opening the digital image, the highlight guide image mapped to the digital image in connection with editing the digital image in the digital image application.

15. The system of claim 13, wherein the operations further comprise:

generating an additional version of the digital image by modifying a resolution of the digital image; and rendering the additional version of the digital image including an additional lens blur effect according to the highlight guide image associated with the digital image.

16. The system of claim 10, wherein determining the luminance boost value comprises:

determining a boost amount in response to an input via a boost setting within a graphical user interface displaying the digital image;

selecting highlight values from the highlight guide image by modifying a luminance threshold based on the boost amount, the highlight values comprising a highlight value of the pixel; and determining a scaling amount for the highlight value of the pixel based on the boost amount.

17. A non-transitory computer readable medium storing executable instructions which, when executed by a processing device, cause the processing device to perform operations comprising:

generating a gradient-highlight mask by:

determining a gradient mask by detecting edges indicating boundaries in a luminance map of a digital image by applying a gradient filter to the luminance map;

determining a highlight mask by determining a subset of pixels of the digital image with luminance values above a luminance threshold; and selecting pixel values that are included in the gradient mask and the highlight mask;

generating a highlight guide image comprising indications of one or more light sources in the digital image by combining the gradient-highlight mask, an inverse of the gradient-highlight mask, and the edges of the luminance map; and rendering the digital image to include a lens blur effect by utilizing the highlight guide image to modify luminance values of one or more pixels of the digital image.

18. The non-transitory computer readable medium of claim 17, wherein detecting the edges indicating boundaries in the luminance map of the digital image comprises:

applying a gradient detection filter to the luminance map; and selecting a subset of gradients that meet a threshold gradient value.

19. The non-transitory computer readable medium of claim 17, wherein rendering the digital image comprises:

determining luminance boost values for the one or more pixels of the digital image based on a boost amount in response to an input via a boost setting in a request to apply the lens blur effect to the digital image; and modifying the luminance values of the one or more pixels of the digital image according to the luminance boost values.

20. The non-transitory computer readable medium of claim 17, wherein rendering the digital image comprises:

generating the highlight guide image as metadata of the digital image; and rendering a plurality of versions of the digital image with a plurality of different lens blur effects by accessing the highlight guide image for each of the plurality of different lens blur effects.

* * * * *